(12) United States Patent
Avina

(10) Patent No.: US 12,137,685 B2
(45) Date of Patent: Nov. 12, 2024

(54) ANTIMICROBIAL LAMINATES AND COATINGS INDICATING EFFICACY

(71) Applicant: Magic 8 Box LLC, Bailey, CO (US)

(72) Inventor: Christopher David Avina, Bailey, CO (US)

(73) Assignee: Magic 8 Box LLC, Bailey, CO (US)

( * ) Notice: Subject to any disclaimer, the term of this patent is extended or adjusted under 35 U.S.C. 154(b) by 0 days.

(21) Appl. No.: 18/389,157

(22) Filed: Nov. 13, 2023

(65) Prior Publication Data

US 2024/0156085 A1  May 16, 2024

Related U.S. Application Data

(62) Division of application No. 17/226,387, filed on Apr. 9, 2021, now Pat. No. 11,812,744.

(60) Provisional application No. 63/163,608, filed on Mar. 19, 2021, provisional application No. 63/028,402, filed on Aug. 20, 2020.

(51) Int. Cl.
*A01N 25/34* (2006.01)
*A01N 25/02* (2006.01)
*C09D 5/02* (2006.01)

(52) U.S. Cl.
CPC ............ *A01N 25/34* (2013.01); *A01N 25/02* (2013.01); *C09D 5/025* (2013.01)

(58) Field of Classification Search
CPC .................................................... C09D 5/025
See application file for complete search history.

(56) References Cited

U.S. PATENT DOCUMENTS

| | | | |
|---|---|---|---|
| 4,310,509 A | 1/1982 | Berglund et al. |
| 6,333,093 B1 | 12/2001 | Burrell et al. |
| 8,470,351 B2 | 6/2013 | Engel et al. |
| 8,858,985 B2 | 10/2014 | Lee et al. |
| 9,161,890 B2 | 10/2015 | Boyd et al. |
| 9,247,736 B2 | 2/2016 | Ylitalo et al. |
| 9,545,101 B2 | 1/2017 | Cok et al. |
| 9,695,323 B2 | 7/2017 | Lin et al. |

(Continued)

FOREIGN PATENT DOCUMENTS

| | | | |
|---|---|---|---|
| KR | 2020015240 | * | 2/2020 |
| KR | 2020015240 A | | 2/2020 |

OTHER PUBLICATIONS https://shop.nevergerms.com/collections/all/products/antimicrobial-door-handle-surface-cover-10-pack; Door Handle Surface Cover—10 Pack; retrieved Jul. 12, 2021 at 2:10pm; published as early as 2021 (as shown by NeverGerms®); 5 pages.

(Continued)

*Primary Examiner* — Nathan T Leong
(74) *Attorney, Agent, or Firm* — Cochran Freund & Young LLC; Christopher Whitham

(57) ABSTRACT

Disclosed is an antimicrobial coating and antimicrobial laminate that can be used on surfaces to prevent the spread of bacteria and viruses. Spray-on techniques can be used with antimicrobial agents mixed with an air-drying antimicrobial coating and a heated liquid plastic antimicrobial coating. Efficacy of the antimicrobial coating can be monitored by detecting changes in texture, color, opaqueness, fluorescence, and other techniques. Soft plastics and acrylics can be used to suspend the antimicrobial agents to provide better efficacy in the release of antimicrobial agents over time.

8 Claims, 21 Drawing Sheets

(56) References Cited

U.S. PATENT DOCUMENTS

| | | | |
|---|---|---|---|
| 9,781,926 | B2 | 10/2017 | Yamada et al. |
| 9,821,094 | B2 | 11/2017 | Dehnad et al. |
| 9,902,168 | B2 | 2/2018 | Brust et al. |
| 9,981,068 | B2 | 5/2018 | Williams et al. |
| 9,981,069 | B2 | 5/2018 | Modak et al. |
| 10,007,200 | B2 | 6/2018 | Farrugia et al. |
| 10,040,957 | B2 | 8/2018 | Brust et al. |
| 10,091,991 | B2 | 10/2018 | Johnston et al. |
| 10,278,390 | B2 | 5/2019 | Rolfe et al. |
| 10,456,498 | B2 | 10/2019 | Wibaux et al. |
| 10,478,802 | B2 | 11/2019 | Cohen et al. |
| 10,512,271 | B2 | 12/2019 | Rautenbach et al. |
| 10,519,323 | B2 | 12/2019 | Zhang et al. |
| 10,632,034 | B2 | 4/2020 | Trinder, II |
| 10,682,431 | B2 | 6/2020 | Fuller et al. |
| 2015/0252157 | A1* | 9/2015 | Ogura .................. C08F 265/06 524/401 |
| 2016/0037766 | A1* | 2/2016 | Toreki .................. A61L 29/126 435/31 |

OTHER PUBLICATIONS https://shop.nevergerms.com/collections/all/products/antimicrobial-door-handle-surface-cover-large-10-pack; Door Handle Surface Cover Large—10 Pack; retrieved Jul. 12, 2021 at 2:12pm; published as early as 2021 (as shown by NeverGerms®); 5 pages.

https://shop.nevergerms.com/collections/all/products/antimicrobial-door-push-plate-surface-cover-x-large-10-pack; Door Push Plate Surface Cover X-Large—10 pack; retrieved Jul. 12, 2021 at 2:14pm; published as early as 2021 (as shown by NeverGerms®); 5 pages.

https://shop.nevergerms.com/collections/all/products/antimicrobial-door-push-plate-surface-cover-10-pack; Door Push Plate Surface Cover—10 Pack; retrieved Jul. 12, 2021 at 2:15pm; published as early as 2021 (as shown by NeverGerms®); 5 pages.

https://shop.nevergerms.com/collections/all/products/antimicrobial-elevator-button-covers-10-pack; Elevator Button Surface Covers Round—10 Pack; retrieved Jul. 12, 2021 at 4:15pm; published as early as 2021 (as shown by NeverGerms®); 5 pages.

https://shop.nevergerms.com/collections/all/products/antimicrobial-elevator-button-surface-covers-square-10-pack; Elevator Button Surface Covers Square—10 Pack; retrieved Jul. 12, 2021 at 4:15pm; published as early as 2021 (as shown by NeverGerms®); 5 pages.

https://shop.nevergerms.com/collections/all/products/antimicrobial-small-handle-surface-cover-10-pack; Small Handle Surface Cover—10 Pack; retrieved Jul. 12, 2021 at 4:16pm; published as early as 2021 (as shown by NeverGerms®); 5 pages.

https://shop.nevergerms.com/collections/all/products/antimicrobial-application-sheets-3-pack; Custom Application Sheets—3 Pack; retrieved Jul. 12, 2021 at 4:16pm; published as early as 2021 (as shown by NeverGerms®); 3 pages.

https://shop.nevergerms.com/collections/all/products/antimicrobial-application-sheets-large-3-pack; Custom Application Sheets Large—3 Pack; retrieved Jul. 13, 2021 at 9:32am; published as early as 2021 (as shown by NeverGerms®); 5 pages.

https://shop.nevergerms.com/collections/all/products/custom-application-wrap-4-inch-roll; Custom Application Wrap—4 inch roll; retrieved Jul. 13, 2021 at 9:33am; published as early as 2021 (as shown by NeverGerms®); 5 pages.

https://shop.nevergerms.com/collections/all/products/door-handle-wrap-style-1; Door Lever Handle Wrap ADA Style 1—10 Pack; retrieved Jul. 13, 2021 at 9:37am; published as early as 2021 (as shown by NeverGerms®); 5 pages.

https://shop.nevergerms.com/collections/all/products/custom-application-wrap-2-inch-roll; Custom Application Wrap—2 inch roll; retrieved Jul. 13, 2021 at 9:38am; published as early as 2021 (as shown by NeverGerms®); 5 pages.

https://shop.nevergerms.com/collections/all/products/copy-of-door-lever-handle-wrap-ada-style-2-10-pack; Door Lever Handle Wrap ADA Style 2—10 Pack; retrieved Jul. 13, 2021 at 9:39am; published as early as 2021 (as shown by NeverGerms®); 5 pages.

https://shop.nevergerms.com/collections/all/products/door-lever-handle-wrap-ada-style-3-10-pack; Door Lever Handle Wrap ADA Style 3—10 Pack; retrieved Jul. 13, 2021 at 9:40am; published as early as 2021 (as shown by NeverGerms®); 5 pages.

https://shop.nevergerms.com/collections/all/products/handicap-access-button-square-4-5-inch; Handicap Access Button Square 4.5"; retrieved Jul. 13, 2021 at 9:41am; published as early as 2021 (as shown by NeverGerms®); 5 pages.

https://shop.nevergerms.com/collections/all/products/handicap-access-button-round-4-5-inch; Handicap Access Button Round 4.5"; retrieved Jul. 13, 2021 at 9:42am; published as early as 2021 (as shown by NeverGerms®); 5 pages.

https://shop.nevergerms.com/collections/all/products/door-knob-wrap-style-a-10-pack; Round Door Knob Wrap Style A—10 Pack; retrieved Jul. 13, 2021 at 9:43am; published as early as 2021 (as shown by NeverGerms®); 5 pages.

https://shop.nevergerms.com/collections/all/products/door-knob-wrap-style-b-10-pack; Round Door Knob Wrap Style B—10 Pack; retrieved Jul. 13, 2021 at 9:44am; published as early as 2021 (as shown by NeverGerms®); 5 pages.

https://www.tarifold.com/us/product/antimicrobial-adhesive-door-handle-stickers; Antimicrobial adhesive door handle stickers; retrieved Jul. 13, 2021 at 9:49am; publication date not listed (as shown by © Tarifold); 6 pages.

https://www.tarifold.com/us/product/antimicrobial-adhesive-stickers; Antimicrobial adhesive stickers; retrieved Jul. 13, 2021 at 9:59am; publication date not listed (as shown by © Tarifold); 6 pages.

https://www.tarifold.com/us/product/antimicrobial-adhesive-door-stickers; Antimicrobial adhesive door stickers; retrieved Jul. 13, 2021 at 10:00am; publication date not listed (as shown by © Tarifold); 5 pages.

https://www.tarifold.com/us/product/antimicrobial-adhesive-counter-stickers; Antimicrobial adhesive counter stickers; retrieved Jul. 13, 2021 at 10:02am; publication date not listed (as shown by © Tarifold); 5 pages.

https://www.avery.ae/tips/antimicrobial-film-labels; Antimicrobial Film Labels; retrieved Jul. 13, 2021 at 10:05am; published as early as 2021 (as shown by Avery); 5 pages.

* cited by examiner

ANTIMICROBIAL LAMINATES AND COATINGS INDICATING EFFICACY

CROSS-REFERENCE TO RELATED APPLICATIONS

The present U.S. Utility Patent application claims priority pursuant to 35 U.S.C. § 120 as a divisional of U.S. Utility patent application Ser. No. 17/226,387, entitled, "ANTIMICROBIAL LAMINATES AND COATINGS INDICATING EFFICACY," filed on Apr. 9, 2021, and is incorporated herein by reference in its entirety and made part of the present U.S. Utility Patent Application for all purposes.

BACKGROUND

Antimicrobials, especially antimicrobial coatings and laminates, are being used to a greater extent than ever. Since the spread of the COVID-19 virus, people have become more aware of the spread of viruses on contact surfaces, especially public contact surfaces. As a result, antimicrobial laminates and coatings have become more and more important for use in both public and private settings to slow or stop the spread of highly contagious viruses. Antimicrobial laminates and coatings also slow and stop the spread of bacterial infectious molecules and fungi, which can lead to serious infections.

SUMMARY OF THE INVENTION

An embodiment of the present invention may therefore comprise: an antimicrobial plastic laminate comprising: an antimicrobial plastic layer having a hardness of less than 50 Shore A or a durability of Class 2, Class 3 or Class 4 according to DIN EN 13300, said antimicrobial layer comprising antimicrobial particles and opaque particles mixed in said antimicrobial plastic layer; a substrate material having a first surface that is attached to said antimicrobial plastic layer; an adhesive disposed on a second surface of said substrate that allows attachment of said antimicrobial plastic laminate to a surface to be protected.

An embodiment of the present invention may further comprise: a method of making an antimicrobial laminate comprising: mixing antimicrobial particles in a liquid plastic medium having a hardness of less than 50 Shore A or a durability of Class 2, Class 3 or Class 4 according to DIN EN 13300, together with particles that render said liquid plastic medium opaque to form an opaque, antimicrobial liquid plastic mixture; forming an opaque, antimicrobial solid layer on a first side of a substrate from said opaque, antimicrobial liquid plastic mixture; placing an adhesive on said second side of said substrate.

An embodiment of the present invention may further comprise: an antimicrobial plastic laminate comprising: a substrate material having a first surface and a second surface; an antimicrobial plastic layer having a hardness of less than 50 Shore A or a durability of Class 2, Class 3 or Class 4 according to DIN EN 13300, said antimicrobial plastic layer comprising antimicrobial particles mixed in said antimicrobial plastic layer, said antimicrobial plastic layer having a first surface disposed on said first surface of said substrate and having a second textured surface that is exposed to users that touch said antimicrobial plastic laminate so that said users can detect wear of said antimicrobial plastic layer where said texture is worn; an adhesive disposed on said second surface of said substrate for attachment of said antimicrobial laminate to a surface to be protected.

An embodiment of the present invention may further comprise: an antimicrobial spray coating for covering a surface to be protected from spreading microbes comprising: a liquid plastic medium that solidifies when sprayed on said surface to create a solid plastic coating on said surface having a hardness of less than 50 Shore A or a durability of Class 2, Class 3 or Class 4 according to DIN EN 13300; antimicrobial particles mixed in said liquid plastic medium; texture particles mixed in said liquid plastic medium that provide a tactile indication of the amount of wear of said plastic coating.

An embodiment of the present invention may further comprise: an antimicrobial spray coating for covering a surface to protect against the spreading of microbes on said surface comprising: a liquid plastic medium that solidifies when sprayed on said surface to create a plastic coating on said surface having a hardness of less than 50 Shore A or a durability of Class 2, Class 3 or Class 4 according to DIN EN 13300; antimicrobial particles mixed in said plastic medium that kill microbes on contact; opaque particles mixed in said plastic medium that make said plastic coating non-transparent so that said surface is visible in areas where said plastic coating is worn.

An embodiment of the present invention may further comprise: a method of protecting a surface from spreading microbes comprising: mixing antimicrobial particles and opaque particles in a liquid plastic medium, wherein the liquid plastic medium is liquid polyvinyl acetate, liquid polyethanyl ethanoate, liquid ethylene-vinyl acetate, or liquid acrylic resin; spraying said liquid plastic medium on a surface to impede transfer of microbes from said surface and cover said surface with opaque particles; allowing said liquid plastic medium to solidify on said surface as a non-transparent solid antimicrobial plastic having a hardness of less than 50 Shore A or a durability of Class 2, Class 3 or Class 4 according to DIN EN 13300.

DETAILED DESCRIPTION OF THE EMBODIMENTS

Figure 1:
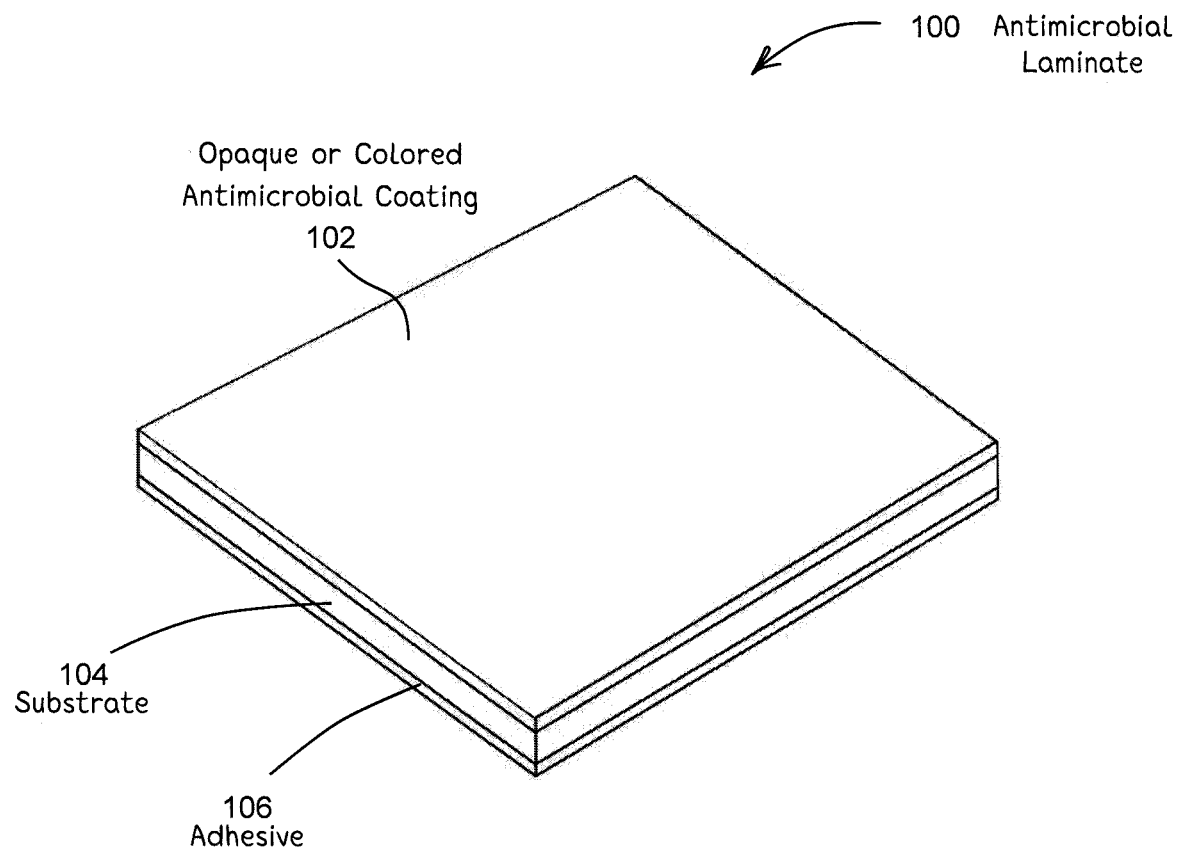
FIG. 1 is a schematic illustration of an embodiment of the invention using an opaque or colored antimicrobial coating.

FIG. 1 is a schematic illustration of an embodiment of an antimicrobial laminate 100. As illustrated in FIG. 1, an opaque or colored antimicrobial coating 102 is placed on top of a substrate 104. An adhesive material 106 is placed on the bottom portion of the substrate 104 so that the antimicrobial laminate 100 can be placed on a surface and adhere to that surface to provide antimicrobial protection. Adhesive 106 may comprise a pressure sensitive adhesive. Antimicrobial protection includes protection against both viruses and bacteria. The antimicrobial material is formulated to kill both viruses and bacteria. For example, an antimicrobial material suitable for the present invention may include povidone-iodine (PVP-I), potassium iodide, potassium permanganate, aurone silver, copper, or zinc as nanoparticles or as compounds. See Addendum A.

The antimicrobial material can take many forms such as silver compounds and other compounds such as disclosed in U.S. Pat. No. 9,247,736, entitled "Antimicrobial Adhesive Films," which is specifically incorporated herein for all that it discloses and teaches. As disclosed in the '736 patent, an antimicrobial hard coat layer is formed, which includes antimicrobial agents that are dispersed in the antimicrobial hard coat layer 14. The antimicrobial layer may include a colored transparent film or opaque film that is decorated with patterns or alphanumeric characters to impart information. The antimicrobial hard coat layer 14 of the '736 patent includes radiation-curable materials such as polymerized monomers, polymerized polymers having molecular weights of about 1,000 or less, such as oligomers and macromonomers. Radiation is used to cure the antimicrobial hard coat layer 14 so that it can be hardened and durable.

In contrast, the present invention uses a soft plastic material having a hardness of less than 50 Shore A or a durability of Class 2, Class 3 or Class 4 according to DIN EN 13300, in which antimicrobial agents are mixed and dispersed. For example, acrylics can be used in which antimicrobial agents are dispersed throughout the acrylic material. Other types of plastic materials can also function as a carrier for the antimicrobial agents. The formulations include: polyvinyl acetate, glycerol and water; polyvinyl acetate, polyvinyl alcohol, propylene glycol and water; polyvinyl acetate, sodium stearate, polyethylene glycol, polyoxyethylene mono-octylphenyl ether, N-vinylpyrrolidone polymer, 2-amino isobutanol, and sodium hydroxide; and ethylene-vinyl acetate (EVA), rosin ester, microcrystalline waxes, diisodecyl phthalate (DIDP) and polyurethanes. See Addendum B.

Antimicrobial agents may comprise agents that kill both bacteria and viruses when the antimicrobial agent comes in contact with the bacteria or virus. These antimicrobial agents may include compounds that include nanoparticles of silver, copper, zinc and other elements in compound form. In order to function well as an antimicrobial surface, the antimicrobial coating 102 must provide a surface in which the antimicrobial agents are able to contact the microbes. If hard plastic surfaces, such as described in the above-referenced '736 patent, the availability and effectiveness of antimicrobial agents on the surface of the hard plastic is quickly diminished when compared to soft plastic and wearable surfaces, which provide a continuous and generous supply of antimicrobials as the soft plastic surface wears. In the '736 patent, antimicrobial agents become quickly worn from the hard plastic surfaces so the hard plastic surface containing antimicrobials becomes ineffective in providing antimicrobial agents on its surface after a short time. Consequently, hard plastic surfaces having antimicrobial agents have limited efficacy.

Softer plastics, however, wear easier than hard plastics. When soft plastics are used to carry antimicrobial agents, which are dispersed through the soft plastic, there is a continuous supply of antimicrobial agents as the soft plastic layer is worn since the antimicrobial agents are dispersed throughout the thickness of the soft plastic layer. Consequently, effective protection can be provided using plastics with a hardness that is classified in accordance with the DIN EN 13300 specification. The DIN EN 13300 standard is a European standard that specifies a general system for classification of water-soluble coating materials and coating systems. The system classifies the wear resistance of various coatings that is primarily directed to paints and varnishes. This classification system can be used to show the wear resistance of plastic-type coatings, as well as paints and varnishes. Coatings with a classification under the DIN EN 13300 in classes 2, 3, and 4 have a suitable wear resistance for the various plastics and polyurethanes and other coating materials that can be used to coat surfaces. Polyurethanes that can be used as finishes for wood. Paints and urethanes are considered to be within the general definition of "plastics." Further, the substrate may have a durability rating of Class 1 when a laminate is used. With regard to elastomers, thermoplastic elastomers and thermoplastics, as well as any of the other plastic coatings that are used, a Shore A hardness of approximately 50 or less or a wearability (durability) in classes 2, 3 or 4 of DIN EN 13300 is suitable for use as a softer plastic containing antimicrobial agents that is capable of providing a continuous supply of antimicrobial agents as the soft plastic layer is worn. In some cases, a wearability of the more durable parts of Class 5 can be used. In the embodiments in which a laminate is used with the antimicrobial layer, a Shore D rating of 80 or more is preferable. In addition, cross-linked matrices of the plastic material are not preferable since the cross-linked matrices tend to harden the plastic material upon curing, such as exposure to UV radiation. A number of applications of the antimicrobial coating are used in outdoor settings in which UV radiation is present. As such, it is preferable to have a hardness and wearability of the antimicrobial coating that does not change as a result of the particular environment in which the antimicrobial coating is used. Further, an antimicrobial coating having a durability and wearability of Class 5 can also be used, depending upon the wearability desired by the user. In that regard, although plastic materials that have a Shore A hardness of 50 or less can be used, plastics having a DIN EN 13300 wearability rating in classes 2, 3 or 4 provides an alternative method of selecting a material that can provide a continuous supply of antimicrobials.

Antimicrobial protective layers having high efficacy find application in various venues, including hospitals. Staph infections result from bacteria that is resistant to available antibiotics. Serious staph infections have been spread in hospitals since it is virtually impossible to clean every surface in a hospital setting that may carry a staph infection or other infectious microbes. For example, the cleaning twice a day of hospital beds, gurneys, all of the surfaces in an operating room, toilets, sinks, doorknobs, walls and other surfaces becomes an enormous task: Coating these surfaces with an antimicrobial laminate or antimicrobial coating can be very effective, in reducing the spread of microbes, including deadly staph infections and reduce the amount of labor.

Although the soft, wearable plastics used in accordance with the present invention provide a continuous supply of antimicrobial agents in amounts that provide high efficacy, these soft, wearable plastic materials can wear off. In other words, soft, wearable plastics are highly effective in providing an antimicrobial coating with an effective supply of antimicrobial agents that are capable of killing viruses, bacteria and fungi, but the antimicrobial coating wears quickly. Some surfaces, such as handrails and posts in subways and buses, may have significant use while other surfaces, such as seats and hand rests in a football stadiums, may experience significantly less use. As another example, some machines in a fitness gym may receive significant use while other machines experience very little use. It is therefore advantageous to be able to detect if an antimicrobial coating or layer on a surface is worn and has become ineffective. Various methods of detecting worn surfaces that have lost efficacy are disclosed below.

In addition, some antimicrobial agents lose effectiveness over time. In that regard, antimicrobial coatings such as antimicrobial coating 102 may have an expiration date after which the antimicrobial agents are no longer effective. In that case, it is beneficial to know when the antimicrobial agents' effectiveness has expired so the antimicrobial laminate 100 can be replaced or otherwise modified to be effective.

The antimicrobial laminate 100, illustrated in FIG. 1, can be used on any desired surface to provide antimicrobial protection for that surface. For example, tabletops, desktops, arm rests, seats, countertops, and frequently used surfaces can employ the antimicrobial laminate 100. Antimicrobial laminate 100 includes an adhesive layer 106 that allows for easy application of the antimicrobial laminate 100 to most surfaces. A peel-away protective layer (not shown) can be placed over the bottom of the adhesive layer 106 so that when the antimicrobial laminate 100 is placed in service, the peel-away layer can be removed and the antimicrobial laminate 100 placed on the surface to be protected. Since the antimicrobial coating 102 is made of a soft plastic that wears to expose antimicrobial agents, it is beneficial to provide an indication as to the efficacy of the antimicrobial coating 102. Antimicrobial coating 102 may be constructed to be opaque or have a specified color. As the antimicrobial coating 102 wears, the substrate 104 will become visible. Also, fading colors can indicate a loss of effectiveness over time, as well as a printed expiration date that is visible through the antimicrobial coating or layer.

Figure 2:
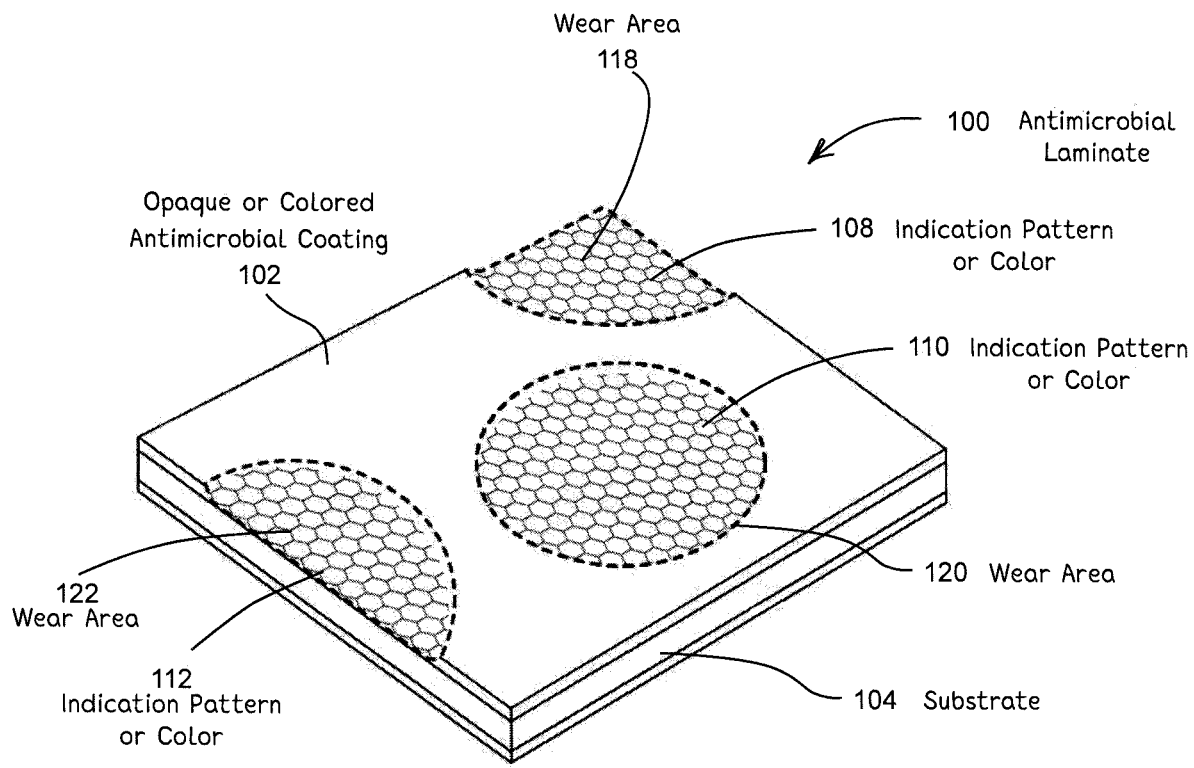
FIG. 2 is a schematic illustration of the embodiment of FIG. 1 in which wear areas are shown in the opaque or colored antimicrobial coating.

FIG. 2 is a schematic isometric diagram of the antimicrobial laminate 100 showing wear areas 118, 120, 122 in the opaque or colored antimicrobial coating 102. The substrate material 104 may have an indication pattern or color such as indication pattern or color 108, 110, 112, which appear in the wear areas 118, 120, 122, respectively. The opaque or colored antimicrobial coating 102, as illustrated in FIG. 2, prevents the viewing of the indication pattern or color in the wear areas. In this manner, when the opaque or colored antimicrobial coating 102 begins to wear, and the indication pattern or color from the substrate 104 becomes visible. A visual indication is therefore provided that the antimicrobial coating is not effective in the wear areas 118, 120, 122.

Various indication patterns can be used, such as a diffraction pattern, a refraction pattern, a holographic image or various colors that contrast with any color that may be used in the antimicrobial coating 102. In addition, a fluorescent coating can be used as the indication pattern 108, 110, 112, which can be placed directly on the top surface of the substrate 104. Fluorescent coatings become visible when exposed to a UV light source.

Figure 3:
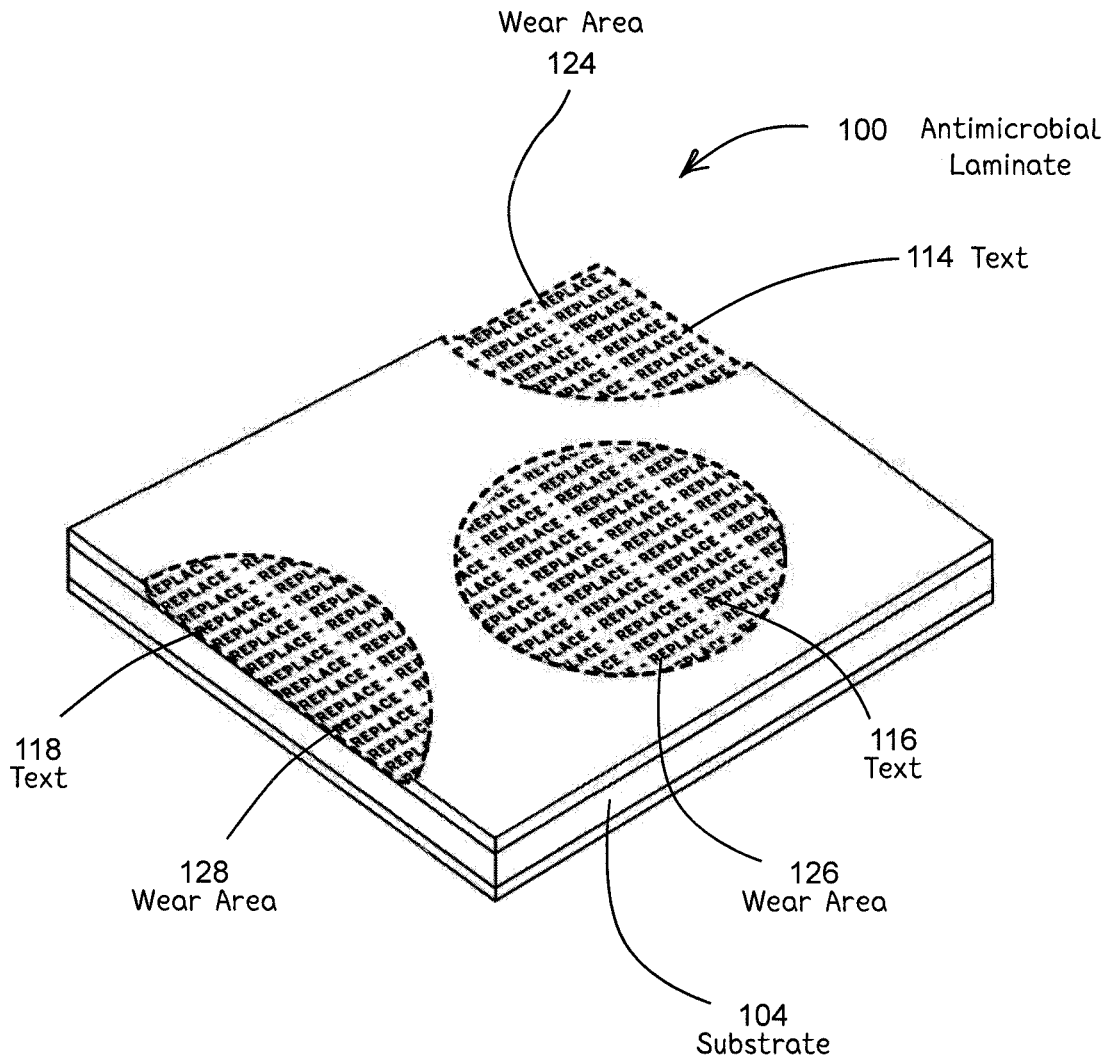
FIG. 3 is a schematic illustration of the embodiment of FIG. 1 in which wear areas in the opaque or colored antimicrobial coating reveal a text layer under the antimicrobial coating.

FIG. 3 is a schematic illustration of another embodiment of antimicrobial laminate 100. As illustrated in FIG. 3, wear areas 124, 126, 128 expose text 114, 116, 118 that is printed on the surface of the substrate layer 104. As illustrated in FIG. 3, the text 114, 116, 118 states "REPLACE." Of course, any kind of textual message can be used to indicate the diminished efficacy of the antimicrobial laminate 100. For example, an expiration date can be provided.

Figure 4:
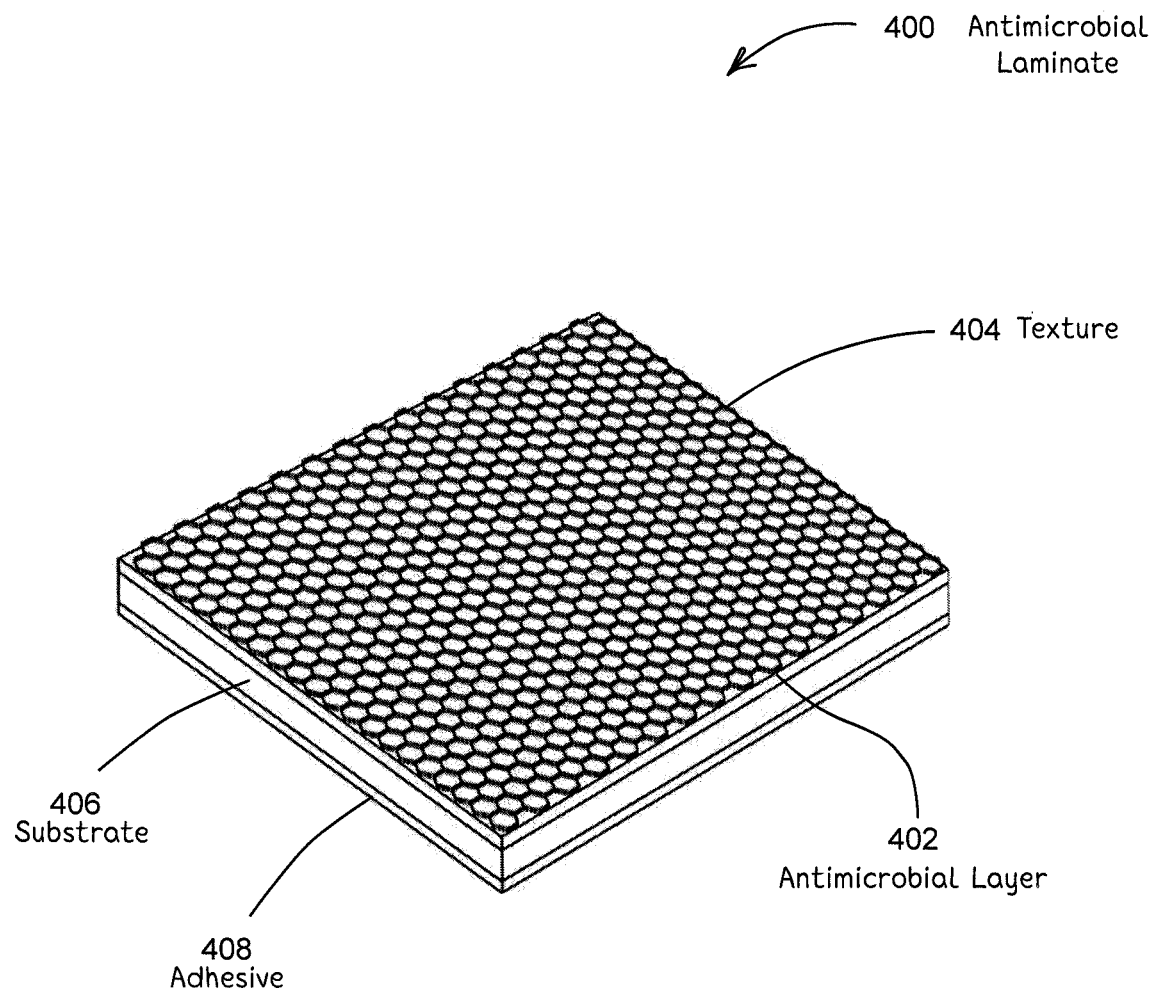
FIG. 4 is a schematic illustration of another embodiment of the invention showing an antimicrobial laminate having a textured surface.

FIG. 4 is a schematic illustration of another embodiment of an antimicrobial laminate 400. As illustrated in FIG. 4, antimicrobial layer 402 has a texture 404. Antimicrobial layer 402 is placed on the substrate 406. The substrate 406 has an adhesive layer 408 on the bottom surface of the substrate 406. Again, a peel-away layer (not shown) can be placed on the bottom surface of the adhesive layer 408. The adhesive layer may comprise a pressure-sensitive adhesive or other adhesive material. The texture 404 and the antimicrobial layer 402 can be formed during the manufacturing of the antimicrobial layer 402 or after the antimicrobial layer 402 is placed on the substrate 406 using an ironing technique or any desired technique for forming texture 404. The texture 404 provides a tactile surface that can be sensed by touching the antimicrobial layer 402. Alternatively, the texture 404 may provide a diffractive or refractive surface that diffracts or refracts light hitting the antimicrobial layer 402.

Figure 5:
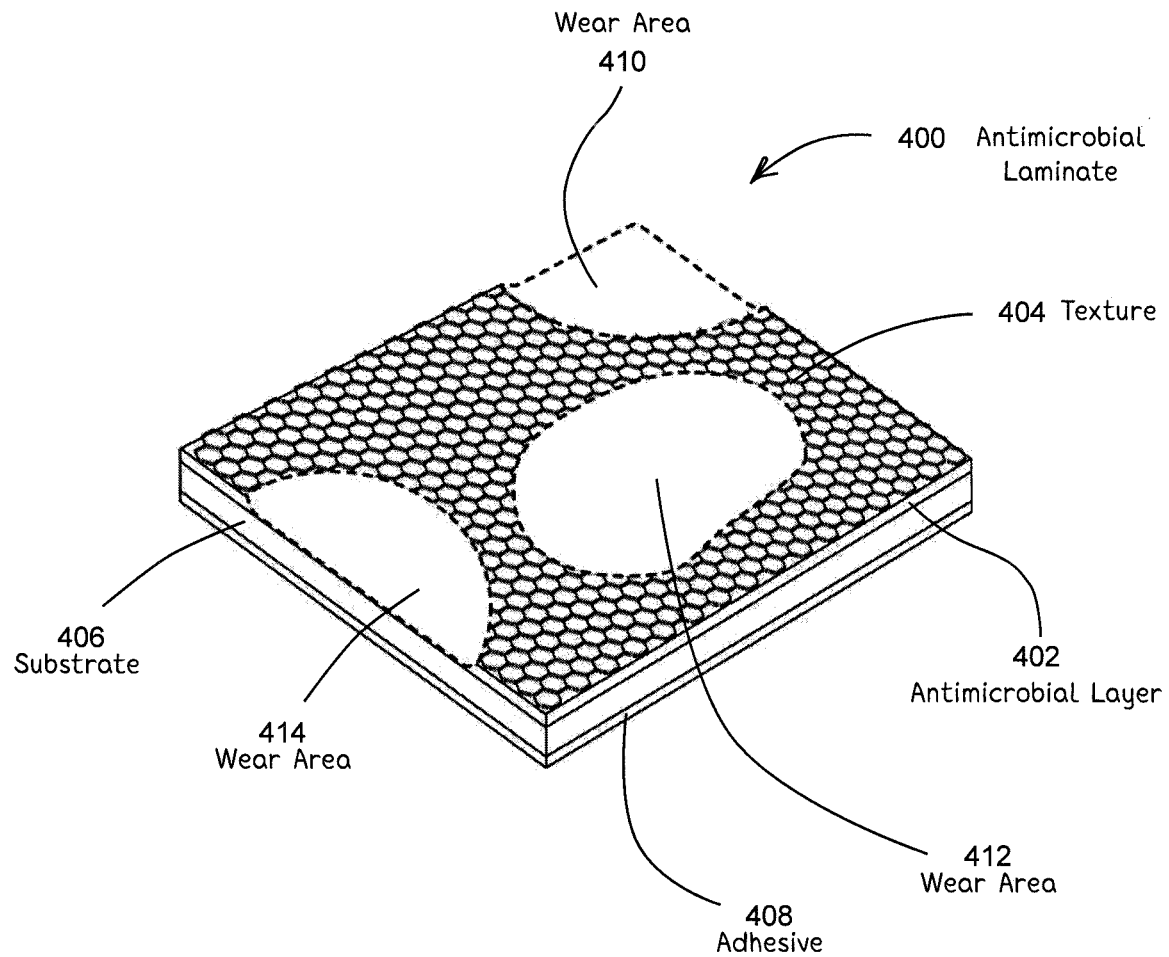
FIG. 5 is schematic illustration of the embodiment of FIG. 4 showing a worn textured surface.

FIG. 5 is a schematic illustration of the antimicrobial laminate 400 illustrated in FIG. 4 with wear areas 410, 412, 414 in the antimicrobial layer 402. In the wear areas 410, 412, 414, the antimicrobial layer 402 is worn so the texture 404 is removed. By feeling or viewing the antimicrobial 402, a user can detect the wear areas 410, 412, 414, which indicate a lack of efficacy of the antimicrobial layer 402. If diffractive or refractive texture 404 is used, the appearance of the antimicrobial layer 402 will not appear to be uniform, indicating that replacement is necessary.

Figure 6:
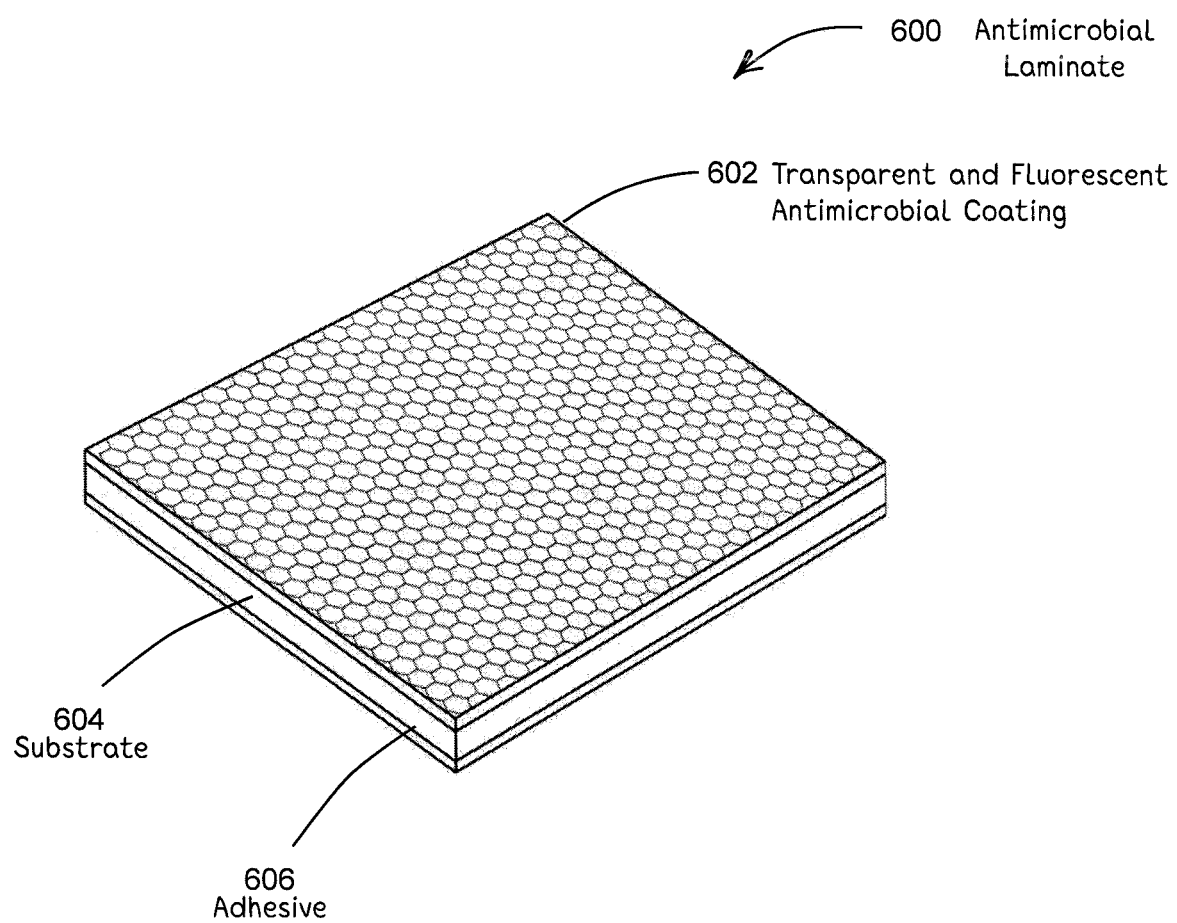
FIG. 6 is a schematic illustration of another embodiment of an antimicrobial laminate having a transparent or fluorescent antimicrobial coating.

FIG. 6 is a schematic illustration of another embodiment of the antimicrobial laminate 600. As shown in FIG. 6, antimicrobial laminate 600 has a transparent and fluorescent antimicrobial coating 602. The transparent and fluorescent antimicrobial coating 602 is disposed on the substrate 604. The substrate 604 may have a pressure-sensitive adhesive 606 on a bottom surface. Again, a peel-away protective layer for the adhesive 606 can be used to protect the bottom surface of the adhesive 606.

Figure 7:
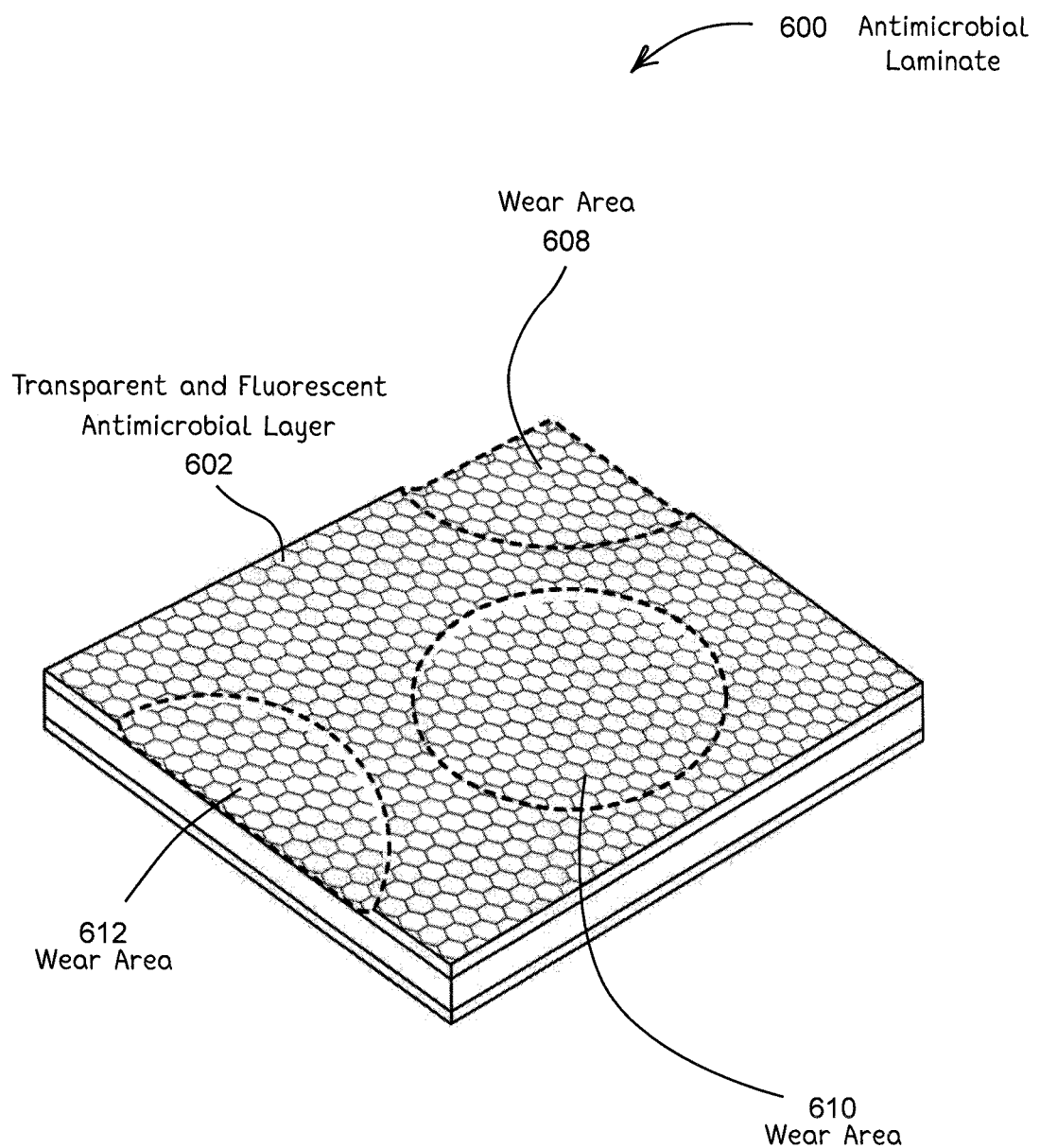
FIG. 7 is a schematic illustration of the antimicrobial laminate of FIG. 6, illustrating wear areas of the transparent and fluorescent antimicrobial coating.

FIG. 7 is a schematic illustration of the antimicrobial laminate 600 of FIG. 6, illustrating various wear areas 608, 610, 612 in the transparent and fluorescent antimicrobial coating 602.

Figure 8:
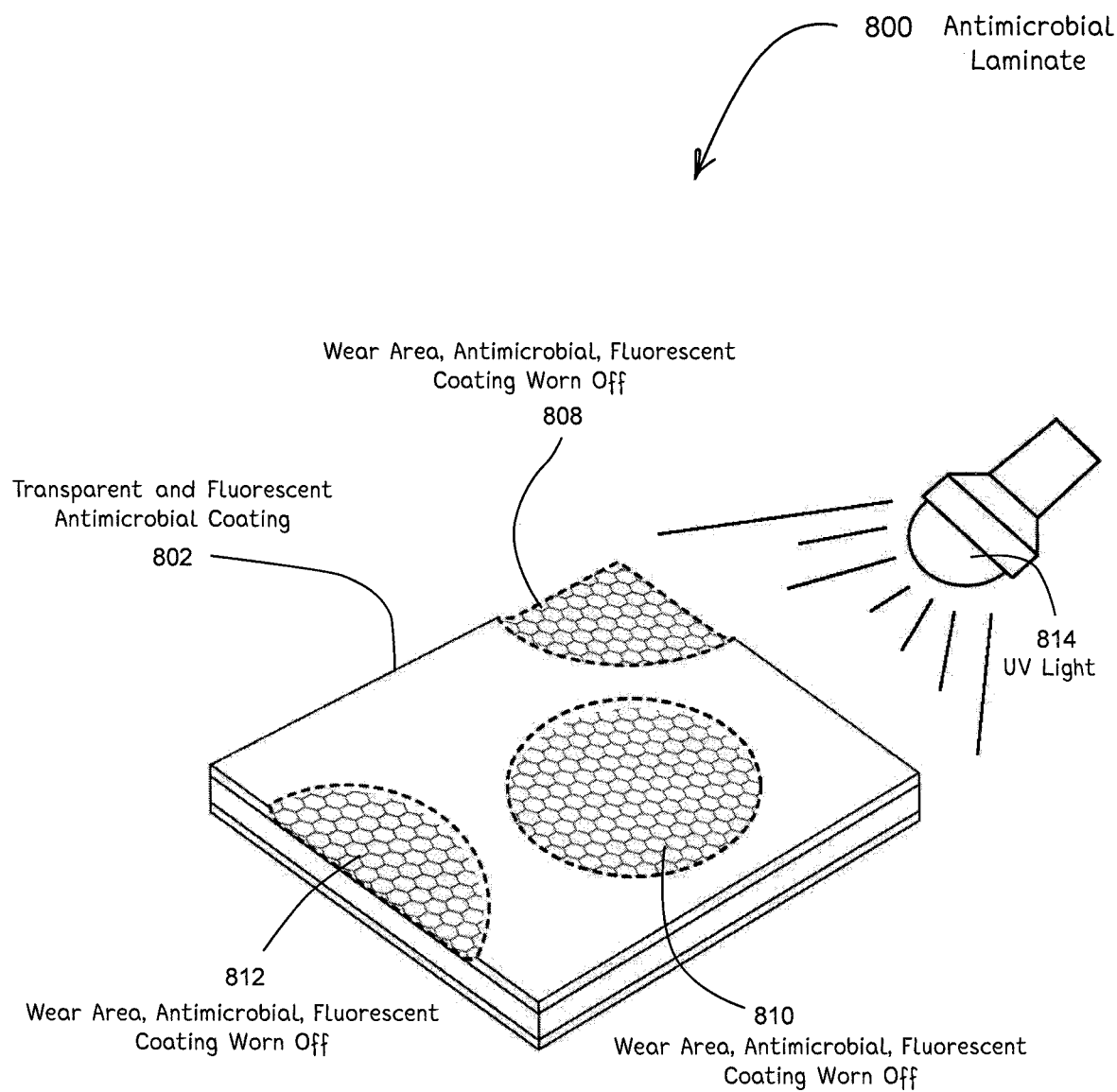
FIG. 8 is a schematic illustration of the antimicrobial laminate of FIG. 7 with a UV light illuminating the surface of the antimicrobial laminate.

FIG. 8 is a schematic illustration of the antimicrobial laminate 800 having wear areas 808, 810, 812 where the transparent fluorescent antimicrobial coating 802 is completely worn off UV lighting 814 illuminates the transparent fluorescent antimicrobial coating 802, which fluoresces under the illumination of the UV light 814 except in the wear areas 808, 810, 812.

Figure 9:
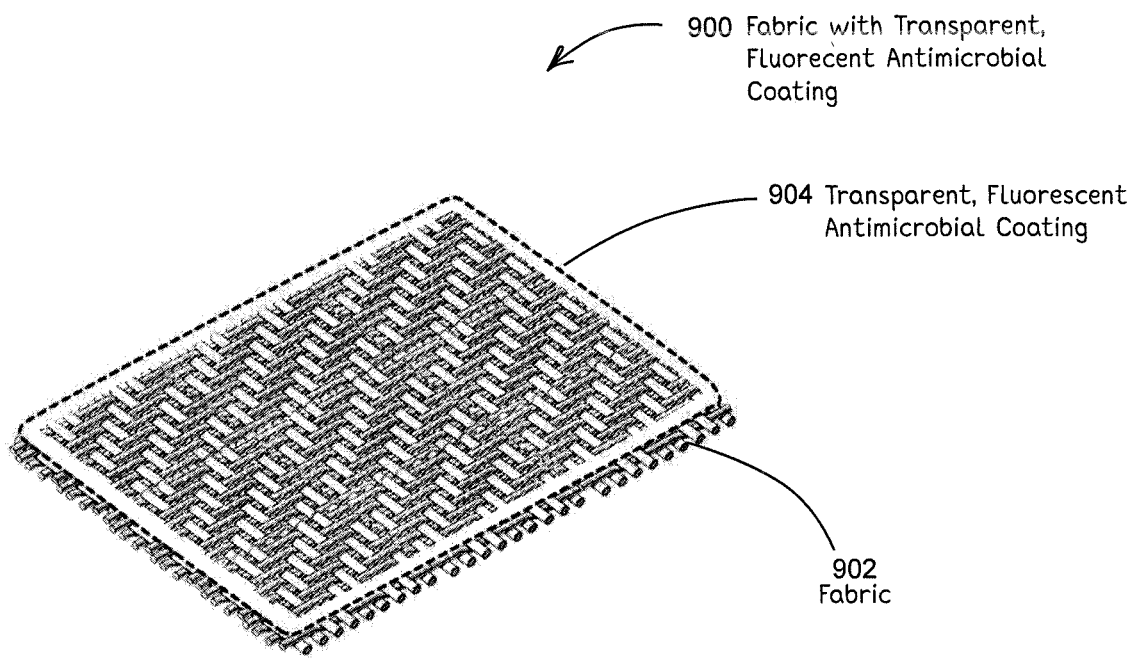
FIG. 9 is a schematic illustration of another embodiment illustrating a fabric with a transparent and fluorescent antimicrobial coating.

FIG. 9 is a schematic illustration of a fabric with a transparent, fluorescent antimicrobial coating 900. As illustrated in FIG. 9, the transparent, fluorescent antimicrobial coating 904 is placed on the fabric 902. The transparent, fluorescent antimicrobial coating 904 may be sprayed onto the fabric 902 or placed on the fabric 902 by washing the fabric 902 in an antimicrobial wash. The antimicrobial wash can include antimicrobial particles, such as nanoparticles, that are mixed with polyvinyl alcohol and/or water to produce the wash additive. The additive can be used together with a detergent or otherwise mixed in the detergent.

Figure 10:
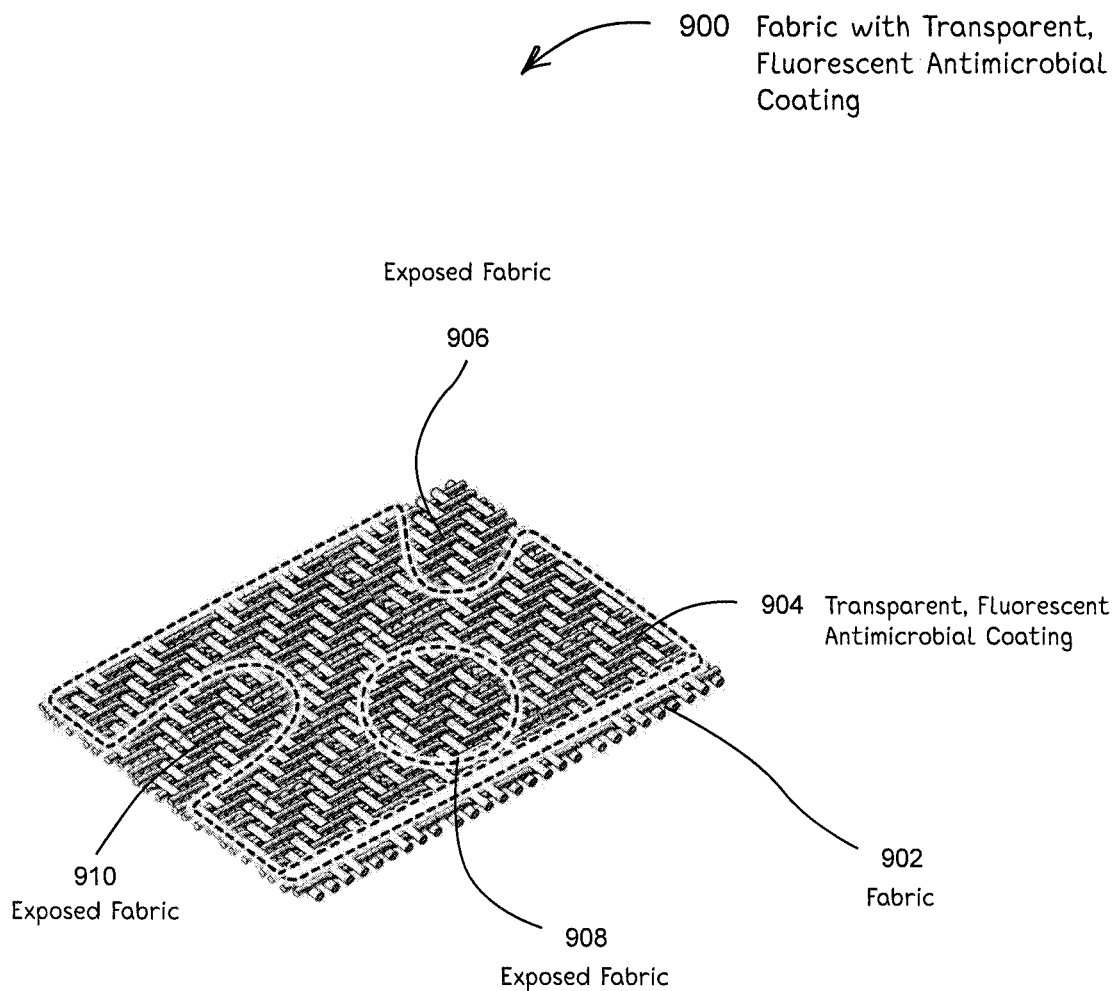
FIG. 10 is a schematic illustration of the embodiment of FIG. 9 illustrating portions where the transparent fluorescent antimicrobial coating is worn, which exposes the fabric.

FIG. 10 is a schematic illustration of the embodiment of FIG. 9 of the fabric with the transparent, fluorescent antimicrobial coating 900. As illustrated in FIG. 10, exposed fabric 906, 908, 910 exists where the transparent, fluorescent antimicrobial coating 904 is worn off of the fabric 902.

Figure 11:
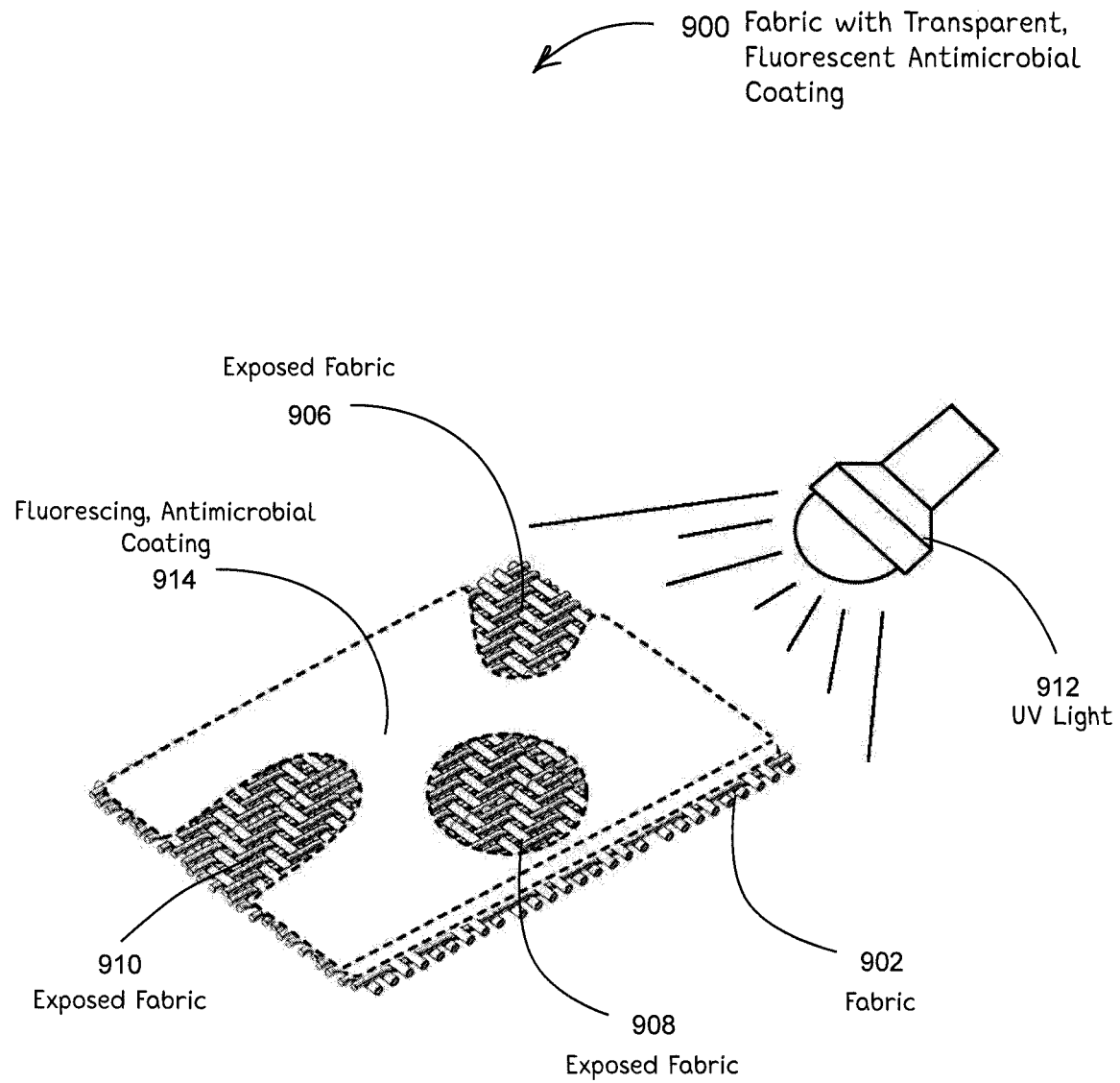
FIG. 11 is schematic illustration of the embodiment of FIG. 10 with a UV light illuminating the antimicrobial coating.

FIG. 11 illustrates the fabric with the transparent, fluorescent antimicrobial coating 900 when placed under a UV light 912. As illustrated in FIG. 11, the exposed fabric 906, 908, 910 does not fluoresce under the UV light 912 so as to indicate portions where the fluorescing antimicrobial coating 914 is worn off of the fabric 902. Since the exposed fabric 906, 908, 910 does not fluoresce, the worn portions can be easily detected using the UV light 912.

Figure 12:
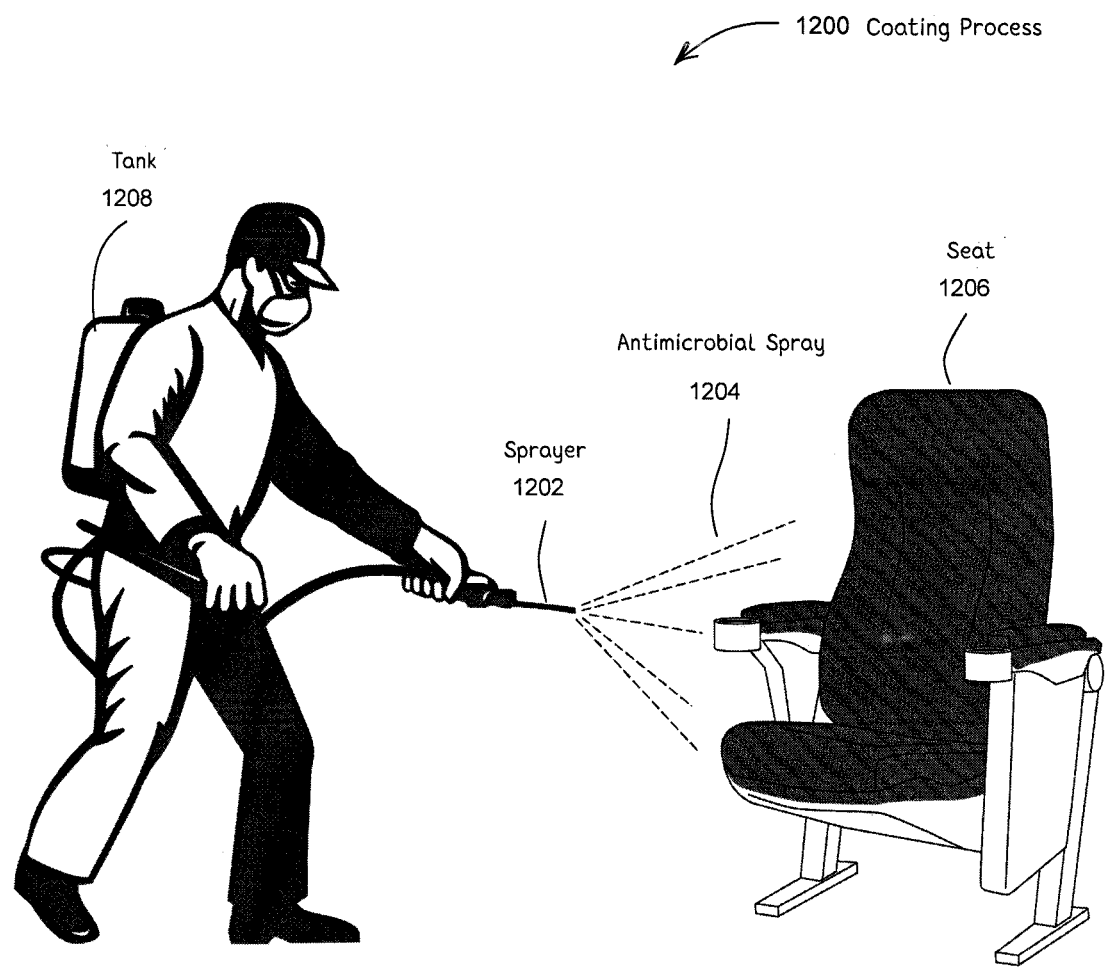
FIG. 12 illustrates a coating process for coating objects, such as a seat, with an antimicrobial coating.

FIG. 12 illustrates a coating process 1200 for coating objects with an antimicrobial coating. A seat, such as seat 1206, can be coated with an antimicrobial coating using a sprayer 1202, which emits an antimicrobial spray 1204. The antimicrobial liquid is included in tank 1208, which is connected to sprayer 1202. The antimicrobial coating can be formulated to be a coating that air dries. For example, acrylic coatings can be used that contain antimicrobial agents. Alternatively, a hot spray coating can be used which then cools and hardens on the surface of the seat 1206. Of course, this technique can be used for any of the applications disclosed herein. Tank 1208 may include a heater that can be battery operated to maintain the antimicrobial coating in a liquid form for spray from a sprayer 1202. Seat 1206 can be any type of seat, including a theater seat, a seat for workout equipment at a fitness club, an airport seat, an airplane seat, a car seat, a bus seat, or any other type of seat. The back portion and the seat portion can be coated together with arm rests on the seat.

Figure 13:
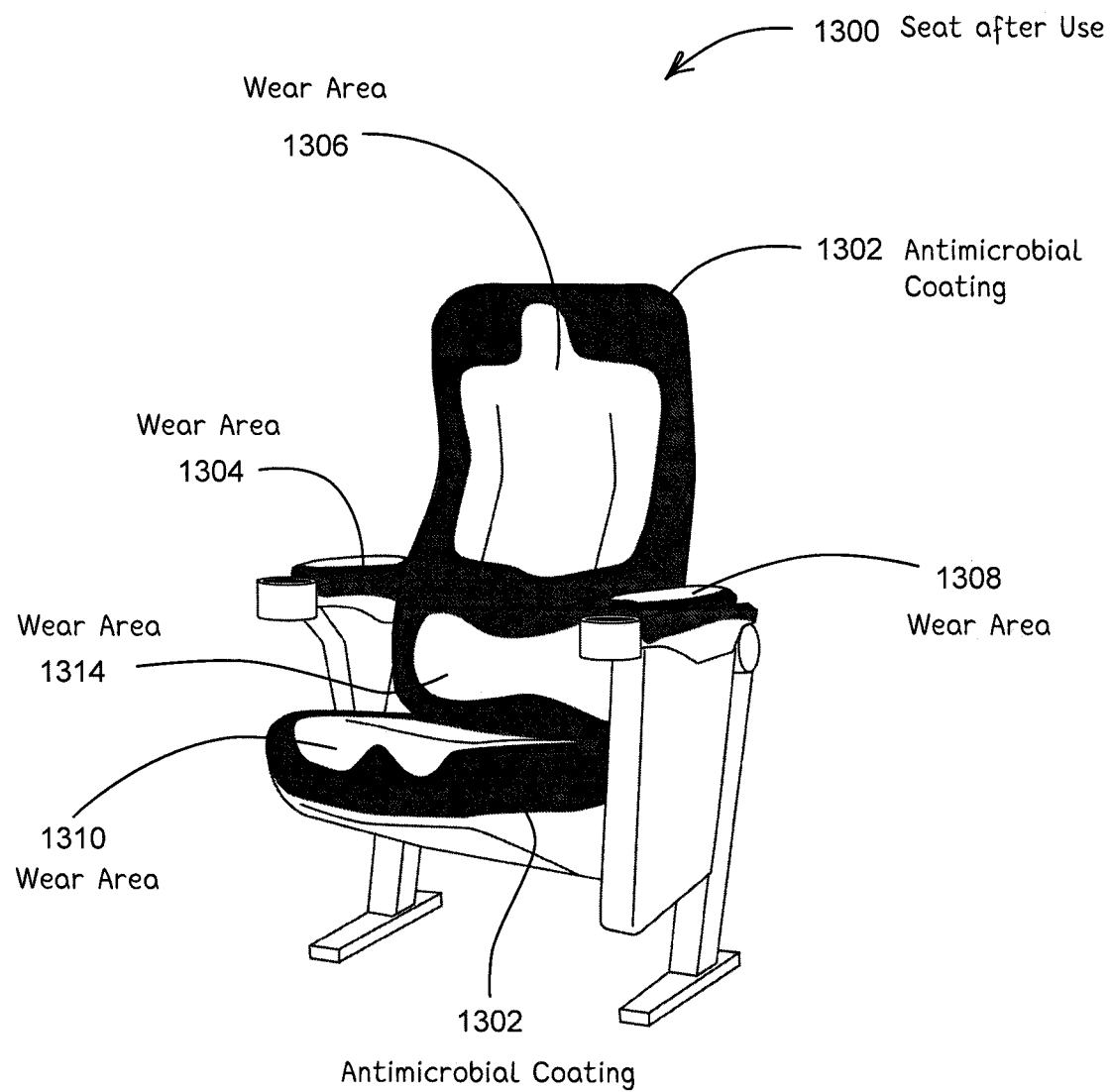
FIG. 13 is a schematic illustration of the seat illustrated in FIG. 12 after use.

FIG. 13 is a schematic illustration of the seat 1300 illustrated in FIG. 12 after use. The seat shows wear areas 1304, 1306, 1308, 1310, 1314 where the antimicrobial coating 1302 has been worn off. These are normally the high wear sections on the seat.

Figure 14:
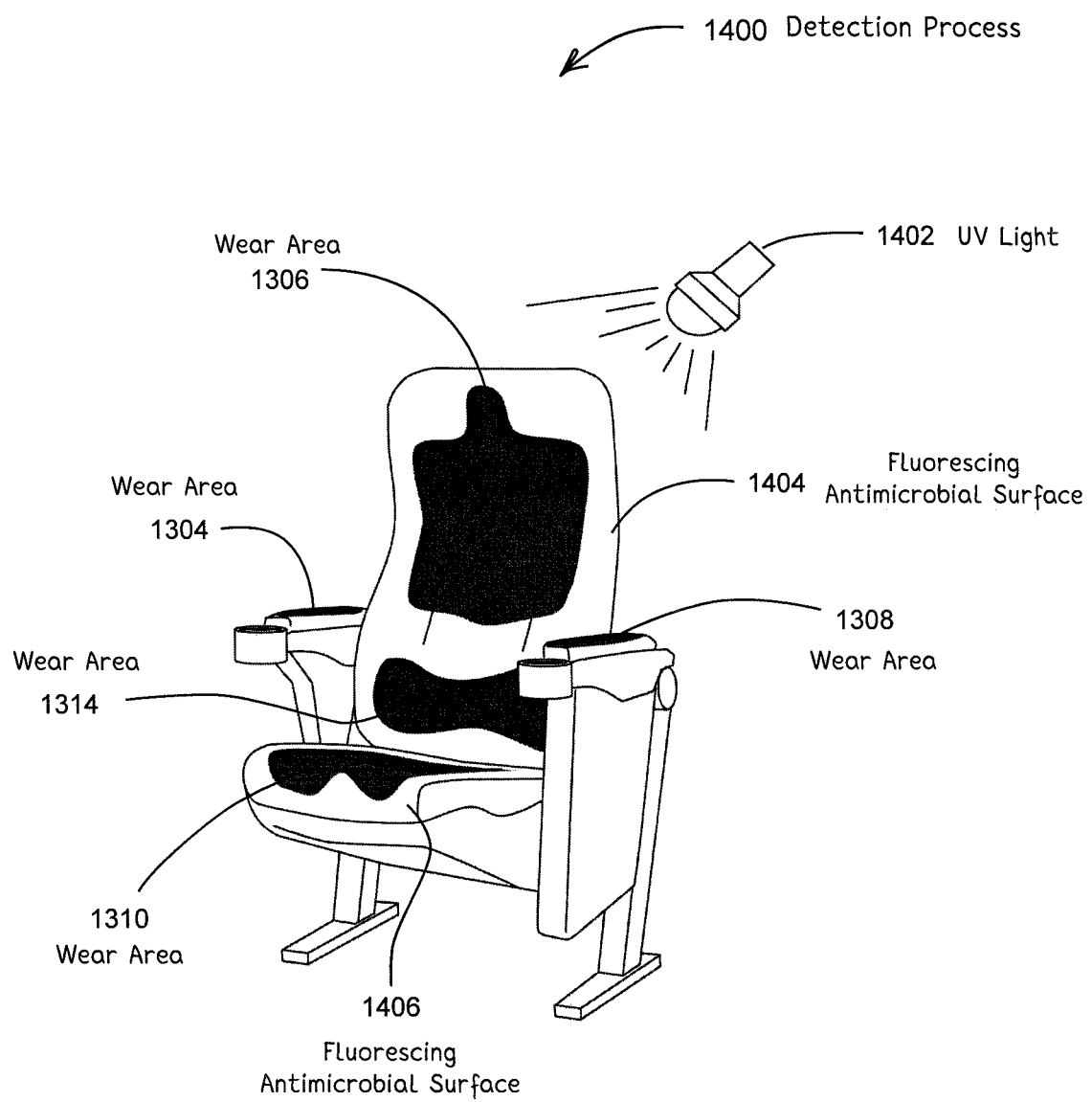
FIG. 14 is a schematic illustration of a detection process for detecting areas where the antimicrobial coating has been worn from the seat illustrated in FIG. 12.

FIG. 14 is a schematic illustration of a detection process 1400 for detecting areas where the antimicrobial coating has been worn off of the seat. UV light 1402 is used to illuminate the seat. The wear areas 1304, 1306, 1308, 1310, 1314 do not fluoresce, while the areas that are not worn and still have a fluorescent coating fluoresce to provide a fluorescing antimicrobial surface 1404, 1406. The use of the UV light 1402 allows easy detection of the wear areas and the non-wear areas as a result of the fluorescing material that is included in the antimicrobial coating. In operation, a user can walk through an airplane or a theater in dark or semi-dark surroundings and detect which seats need to be recoated.

Figure 15:
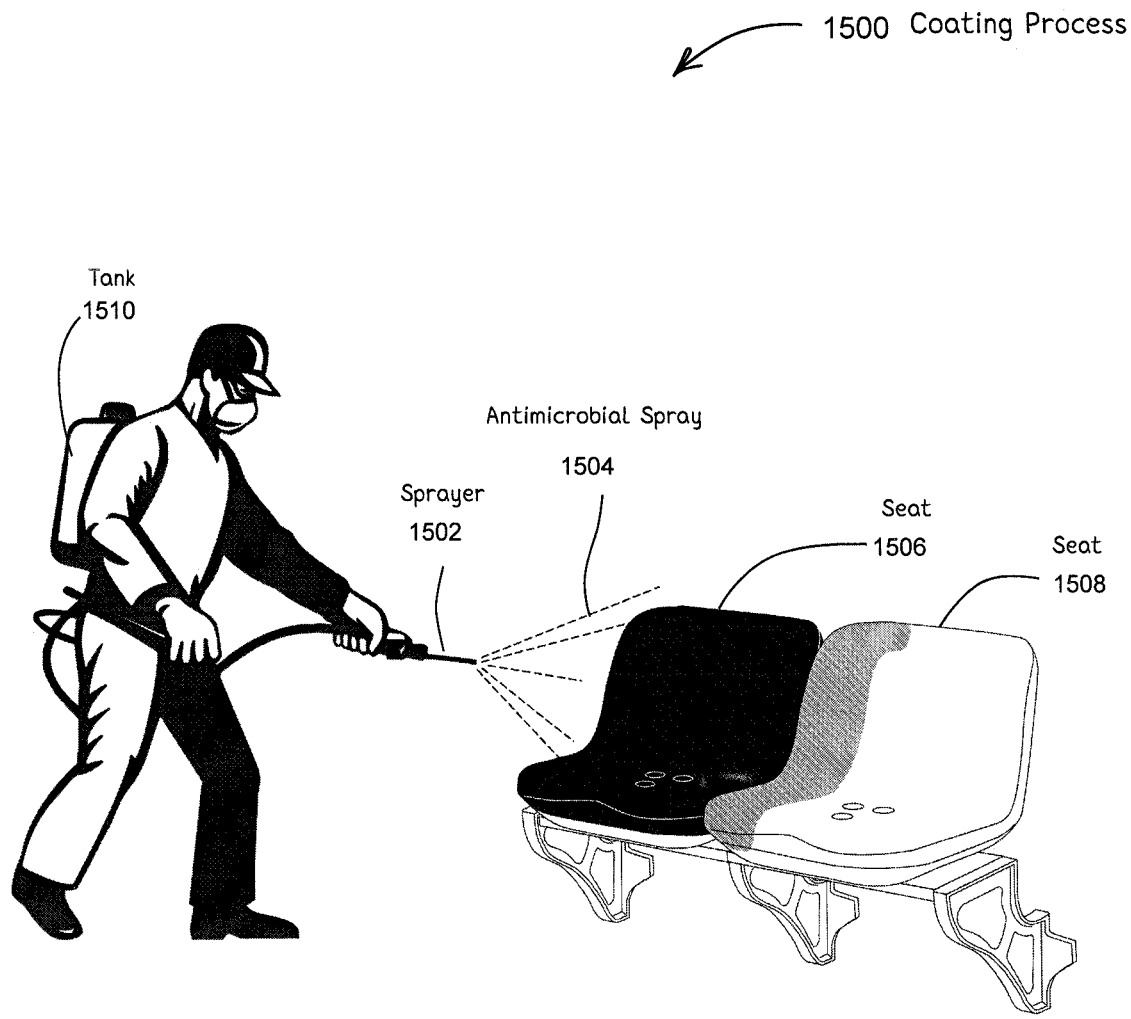
FIG. 15 is a schematic illustration of the coating process for coating seats with the antimicrobial spray.

FIG. 15 is a schematic illustration of the coating process 1500. A user carries a sprayer 1502 that is connected to a tank 1510, which stores an antimicrobial coating that will dry in open air. The sprayer 1502 generates an antimicrobial spray 1504, which is applied to seats 1506, 1508. The antimicrobial coating that is used that can dry in air may contain a water-soluble acrylic that dries quickly on the surface of the seats 1506, 1508 after being emitted as an antimicrobial spray 1504 from sprayer 1502. As set forth above, the antimicrobial spray 1504 may comprise a heated antimicrobial plastic spray that cools to form a coating on seat 1506. Again, tank 1510 may comprise a heater that maintains the antimicrobial plastic coating material in a heated condition so that it remains as a liquid and can be sprayed by sprayer 1502.

Figure 16:
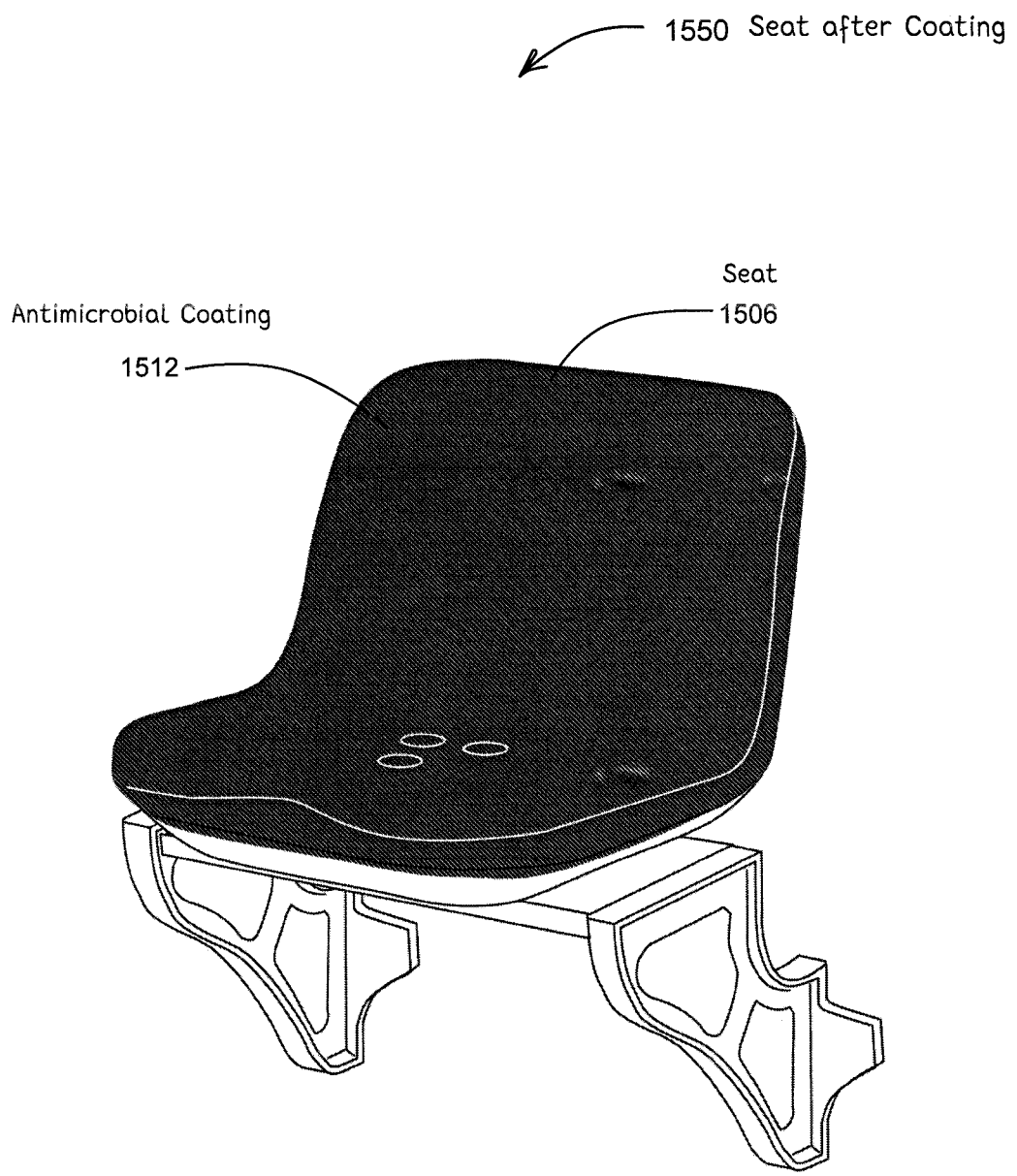
FIG. 16 is a schematic illustration of a seat that is coated with the antimicrobial coating.

FIG. 16 is a schematic illustration of a seat after coating 1550. Seat 1506 is coated with the antimicrobial coating 1512. The seat 1506 can be an arena seat, a stadium seat, a seat in an airport, or other public or private seating. Users of the seat 1506 touch the seat 1506 with their hands and bodies, which may be contaminated with microbes.

Figure 17:
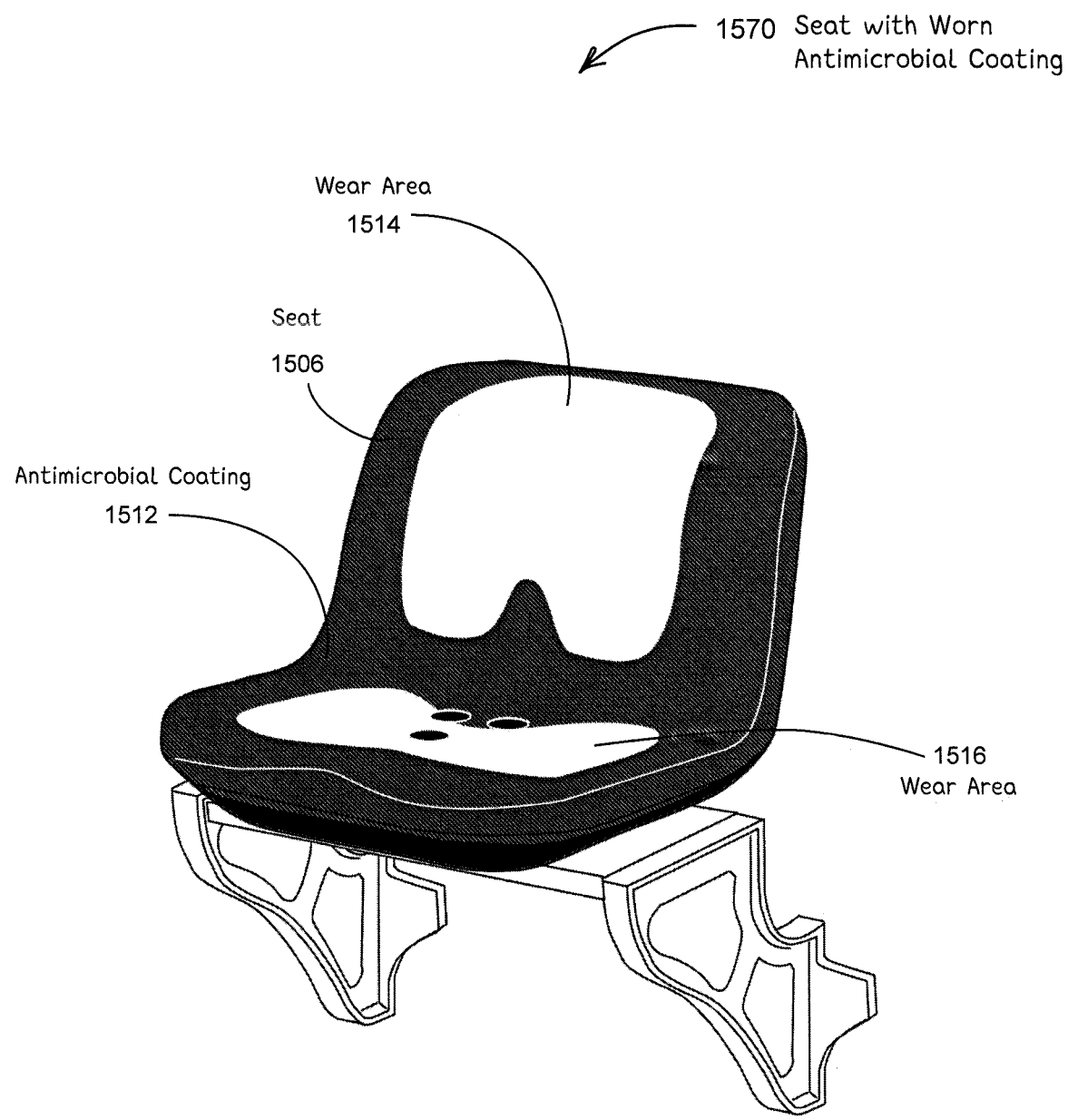
FIG. 17 is a schematic illustration of the seat illustrated in FIG. 16 showing various wear areas in which the antimicrobial coating has been removed through usage and wear.

FIG. 17 is a schematic illustration of a seat with worn antimicrobial coating 1570. Seat 1506 shows various wear areas 1514, 1516, in which the antimicrobial coating 1512 has been removed through usage and wear.

Figure 18:
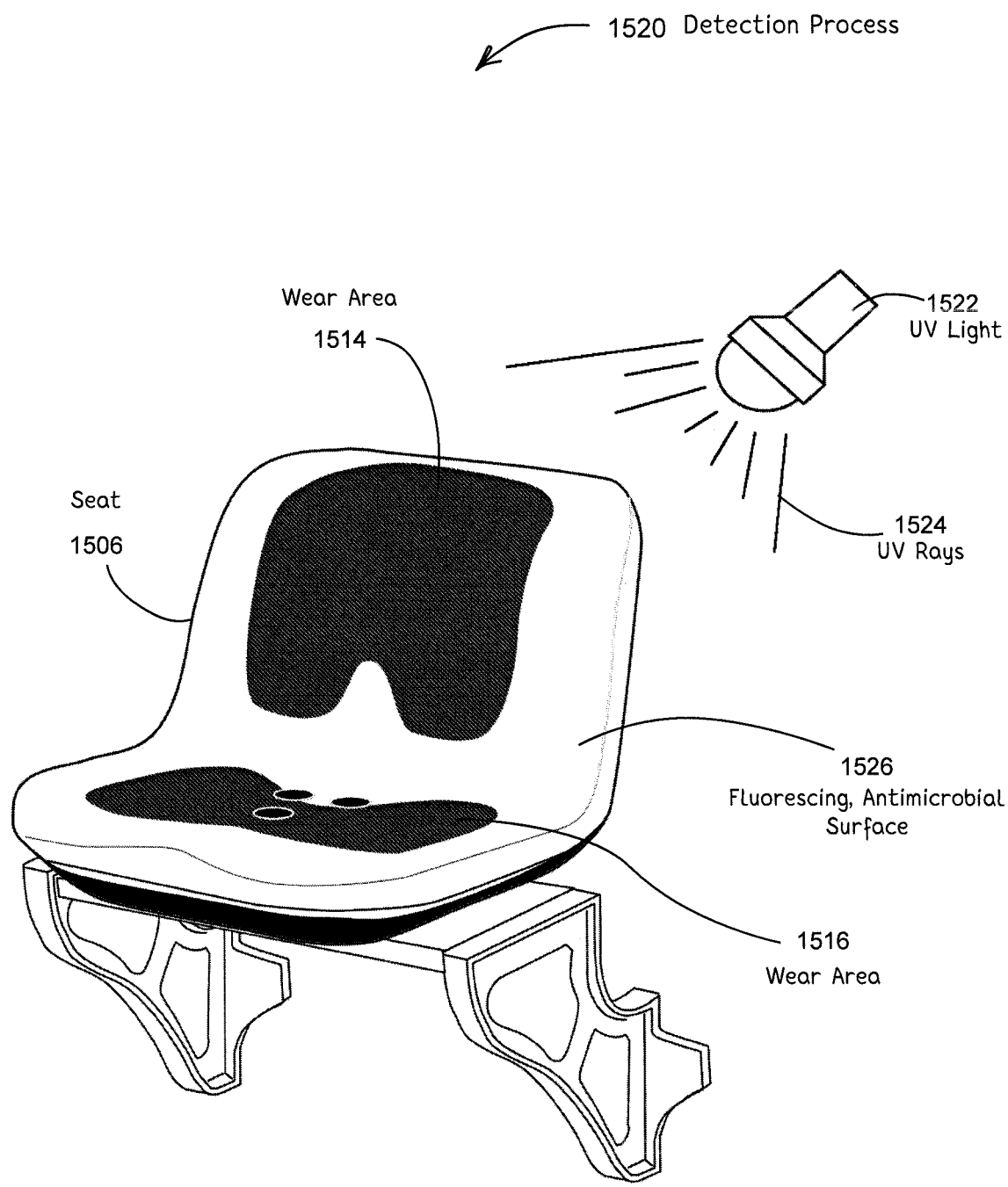
FIG. 18 is an illustration of a detection process to determine if wear areas are present on the seat illustrated in FIG. 16.

FIG. 18 is an illustration of a detection process 1520 to determine if wear areas, such as wear areas 1514, 1516 are present on the seat 1506. In regions where the antimicrobial coating has been worn away, i.e., wear areas 1514, 1516, the surface of the seat does not fluoresce. In areas where the antimicrobial coating has not been worn away, the surface of the seat fluoresces, such as fluorescing antimicrobial surface 1526. Of course, other methods of detection, such as indicated above using texture, opaque antimicrobial coatings and colored antimicrobial coatings can also be used to eliminate the need for illumination by a UV light.

Figure 19:
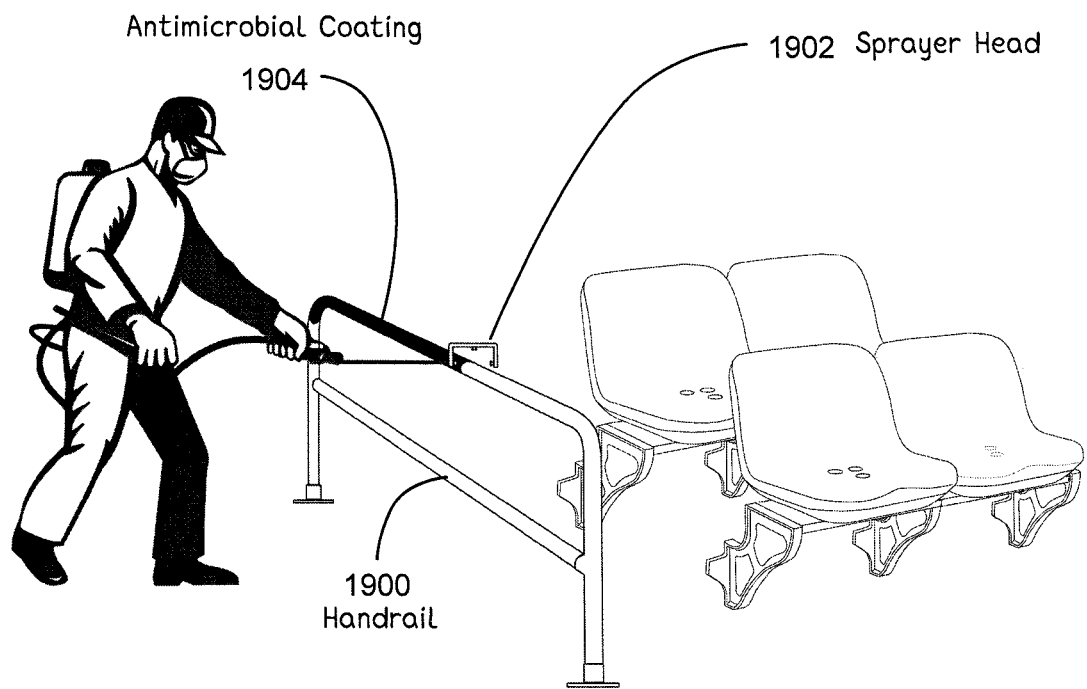
FIG. 19 is a schematic illustration of application of an antimicrobial coating on a handrail.

FIG. 19 is a schematic illustration of application of an antimicrobial coating 1904 on handrail 1900. A sprayer head 1902 is used to coat the handrail 1900 on multiple sides. As illustrated in FIG. 19, the handrail 1900 may be used in an arena, a stadium, a theater, a bus, a subway or other locations.

Figure 20:
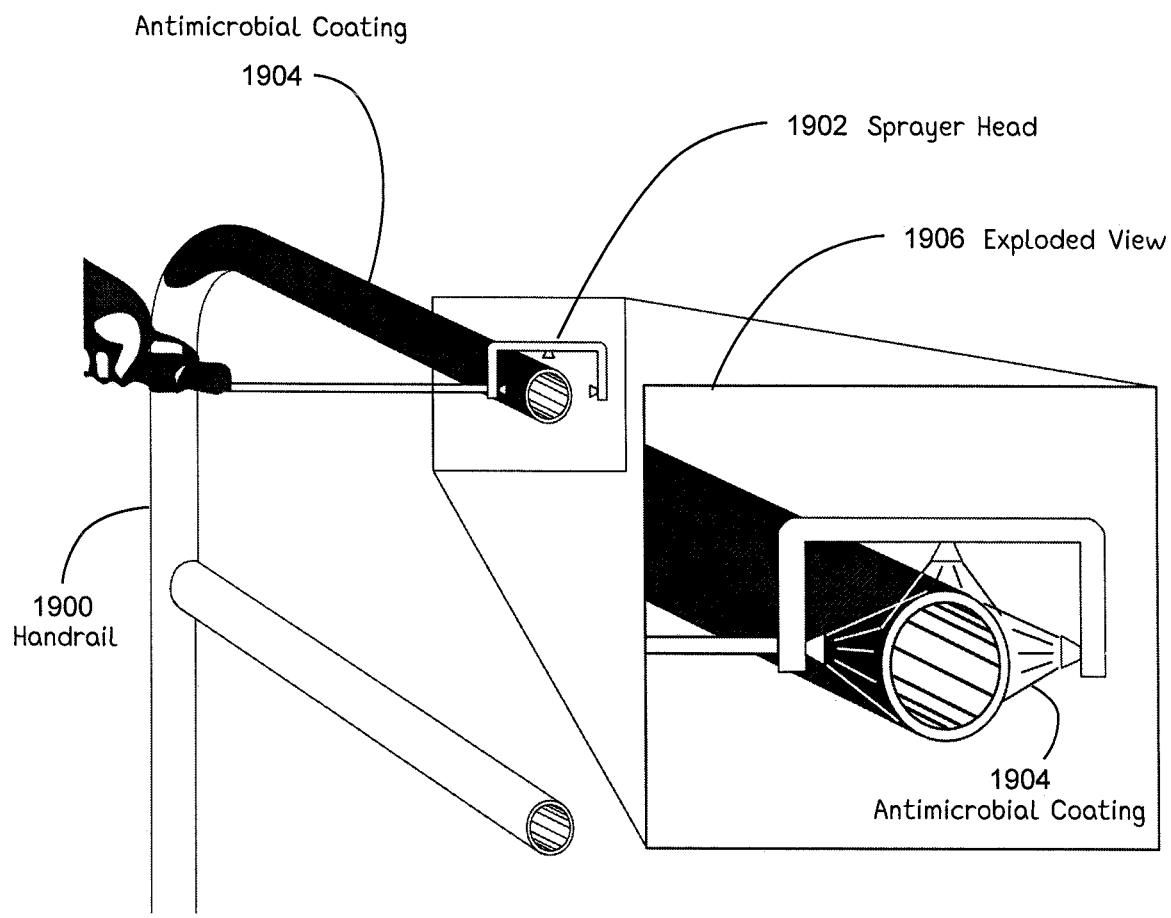
FIG. 20 is a schematic expanded view of the illustration of an antimicrobial coating on a handrail shown in FIG. 19.

FIG. 20 is a schematic expanded view of FIG. 19. As illustrated in FIG. 20, the sprayer head 1902 has three sprayers that coat the handrail 1900 with the antimicrobial coating 1904. This results in easy and quick application to multiple sides of the handrail 1900. As shown in the exploded view 1906, the sprayers for the antimicrobial coating 1904 can project at a wide angle so the entire surface of the handrail 1900 is coated.

Figure 21:
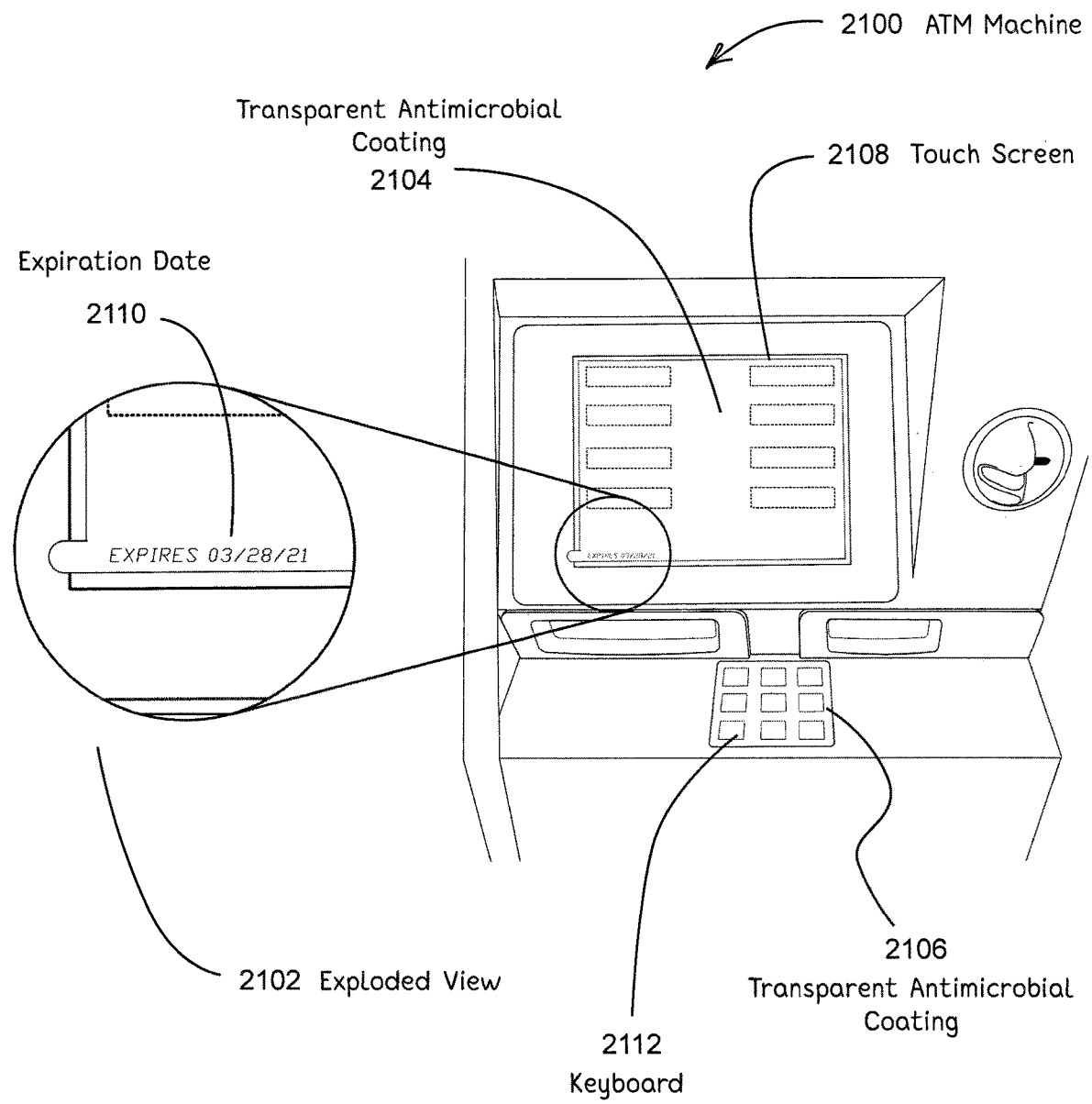
FIG. 21 is a schematic illustration of an ATM machine that is coated with antimicrobial coatings.

FIG. 21 is a schematic illustration of an ATM machine 2100 that is coated with antimicrobial coatings. As illustrated in FIG. 21, a transparent antimicrobial coating 2104 covers the touch screen 2108. As shown in the exploded view 2102, an expiration date 2110 appears on the transparent antimicrobial coating 2104. The expiration date can be embossed in the transparent antimicrobial 2104 or added as a sticker when the transparent antimicrobial coating 2104 is applied to the touch screen 2108. In addition, the transparent antimicrobial coating 2106 can be placed on the keyboard 2112 to ensure that microbes are not transferred via the keyboard 2112.

Accordingly, the present invention includes various methods of placing antimicrobial protective layers on surfaces using antimicrobial laminates and sprays. Various methods are disclosed to detect the effectiveness of the antimicrobial coating. Soft plastics, such as acrylics, and other soft plastics, can be used to increase the efficacy by providing a continuous supply of antimicrobials as the antimicrobial layer wears. The present invention also provides an indication of the efficacy of the antimicrobial coating. These coatings can be used very effectively on surfaces that have high use by numerous individuals, such as in workout clubs on the workout equipment, subways, trains, and other public transportation, and on surfaces that are commonly touched by the public. The present invention effectively stops the spread of bacteria, viruses and fungi in both public and private areas.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An antimicrobial plastic laminate comprising:
an antimicrobial plastic layer having a hardness of less than 50 Shore A or a durability of Class 2, Class 3 or Class 4 according to DIN EN 13300, said antimicrobial layer comprising antimicrobial particles and opaque particles mixed in said antimicrobial plastic layer, wherein the plastic in said antimicrobial plastic layer is polyvinyl acetate, polyethanyl ethanoate, ethylene-vinyl acetate, or acrylic resin;
a substrate material having a first surface that is attached to said antimicrobial plastic layer;
an adhesive disposed on a second surface of said substrate that allows attachment of said antimicrobial plastic laminate to a surface to be protected.

2. The antimicrobial plastic laminate of claim 1 wherein said opaque particles comprise color particles.

3. The antimicrobial plastic laminate of claim 1 wherein said opaque particles comprise reflective particles.

4. The antimicrobial plastic laminate of claim 1 further comprising written text formed on a surface of said substrate that is visible when said antimicrobial plastic layer is worn.

5. The antimicrobial plastic laminate of claim 1 further comprising a color layer formed on a surface of said substrate that is visible when said antimicrobial plastic layer is worn.

6. The antimicrobial plastic laminate of claim 1 further comprising a fluorescent layer formed on a surface of said substrate that is visible under UV light when said antimicrobial plastic layer is worn.

7. An antimicrobial plastic laminate comprising:
a substrate material having a first surface and a second surface;
an antimicrobial plastic layer having a hardness of less than 50 Shore A or a durability of Class 2, Class 3 or Class 4 according to DIN EN 13300, said antimicrobial plastic layer comprising antimicrobial particles mixed in said antimicrobial plastic layer, said antimicrobial plastic layer having a first surface disposed on said first surface of said substrate and having a second textured surface that is exposed to users that touch said antimicrobial plastic laminate so that said users can detect wear of said antimicrobial plastic layer where said texture is worn, wherein the plastic in said antimicrobial plastic layer is polyvinyl acetate, polyethanyl ethanoate, ethylene-vinyl acetate, or acrylic resin;
an adhesive disposed on said second surface of said substrate for attachment of said antimicrobial laminate to a surface to be protected.

8. The antimicrobial plastic laminate of claim 7 further comprising fluorescent particles mixed in said antimicrobial plastic layer that cause said antimicrobial plastic layer to fluoresce under UV light.

* * * * *